(12) United States Patent
Fukuyo et al.

(10) Patent No.: US 10,328,387 B2
(45) Date of Patent: Jun. 25, 2019

(54) METHOD AND APPARATUS OF MANUFACTURING EXHAUST GAS-PURIFYING CATALYST

(71) Applicant: Cataler Corporation, Kakegawa-shi, Shizuoka (JP)

(72) Inventors: Shoko Fukuyo, Kakegawa (JP); Minoru Ito, Kakegawa (JP)

(73) Assignee: CATALER CORPORATION, Kakegawa-shi (JP)

( * ) Notice: Subject to any disclaimer, the term of this patent is extended or adjusted under 35 U.S.C. 154(b) by 0 days.

(21) Appl. No.: 15/972,748

(22) Filed: May 7, 2018

(65) Prior Publication Data

US 2018/0250630 A1 Sep. 6, 2018

Related U.S. Application Data

(63) Continuation of application No. PCT/JP2017/017877, filed on May 11, 2017.

(30) Foreign Application Priority Data

Jul. 27, 2016 (JP) .................................. 2016-147592

(51) Int. Cl.
*B01D 46/00* (2006.01)
*B01D 53/86* (2006.01)
(Continued)

(52) U.S. Cl.
CPC ..... *B01D 53/8628* (2013.01); *B01D 46/0001* (2013.01); *B01D 46/2418* (2013.01);
(Continued)

(58) Field of Classification Search
CPC .................... B01D 53/86; B01D 53/94; B01D 2255/0155; B01D 7/22; B01J 37/02
(Continued)

(56) References Cited

U.S. PATENT DOCUMENTS 6,478,874 B1 * 11/2002 Rosynsky ............ B01J 37/0215
118/50
7,521,087 B2 * 4/2009 Rosynsky .............. B05D 3/042
427/231
(Continued)

FOREIGN PATENT DOCUMENTS

| CN | 1639447 A | 7/2005 |
|---|---|---|
| CN | 1656307 A | 8/2005 |

(Continued)

OTHER PUBLICATIONS

International Search Report dated Aug. 8, 2017 in connection with PCT International Application No. PCT/JP2017/017877.
(Continued)

*Primary Examiner* — Tom P Duong
(74) *Attorney, Agent, or Firm* — John P. White; Cooper & Dunham LLP

(57) ABSTRACT

A method of manufacturing an exhaust gas-purifying catalyst comprising: moving a gas-flow control tool from a first position where the gas-flow control tool faces the first end face with the slurry in the reservoir interposed therebetween and is spaced apart from the slurry in the reservoir to a second position where the gas-flow control tool faces the first end face with a distance from the first end face shorter than that in the first position, in a period during which the slurry flows from the first end face's side toward the second end face's side, the gas-flow control tool being configured to generate a distribution of linear velocities of gas flows when the gas-flow control tool faces the first end face and gas is passed therethrough toward the first end face.

7 Claims, 13 Drawing Sheets

(51) Int. Cl.

| | | |
|---|---|---|
| *B05C 7/04* | (2006.01) | |
| *B01J 35/04* | (2006.01) | |
| *B01D 53/94* | (2006.01) | |
| *B01J 37/02* | (2006.01) | |
| *B01D 46/24* | (2006.01) | |
| *B01J 19/00* | (2006.01) | |
| B05D 7/22 | (2006.01) | |
| F01N 3/28 | (2006.01) | |
| B05D 3/04 | (2006.01) | |

(52) U.S. Cl.
CPC .......... *B01D 53/9427* (2013.01); *B01J 19/00* (2013.01); *B01J 35/04* (2013.01); *B01J 37/0225* (2013.01); *B05C 7/04* (2013.01); *B01D 2255/9155* (2013.01); *B01J 37/0246* (2013.01); *B05D 3/0493* (2013.01); *B05D 7/22* (2013.01); *F01N 3/2828* (2013.01); *F01N 2330/04* (2013.01); *F01N 2330/06* (2013.01)

(58) Field of Classification Search
USPC .............................. 427/430.1, 235, 238, 232
See application file for complete search history.

(56) References Cited

U.S. PATENT DOCUMENTS

| | | | |
|---|---|---|---|
| 7,678,416 B2 * | 3/2010 | Suzuki ..................... | B01J 35/04 427/230 |
| 8,302,557 B2 | 11/2012 | Goshima et al. | |
| 8,703,236 B2 | 4/2014 | Chandler et al. | |
| 9,227,184 B2 * | 1/2016 | Nakano ................ | B01J 37/0215 |
| 9,488,087 B2 | 11/2016 | Mergner et al. | |
| 10,071,369 B2 * | 9/2018 | Otsuki .................. | B01J 37/0219 |
| 2001/0024686 A1 * | 9/2001 | Kiessling ............. | B01J 35/0006 427/235 |
| 2011/0268624 A1 * | 11/2011 | Chandler ........... | A44B 13/0011 422/222 |
| 2017/0274412 A1 | 9/2017 | Sekine et al. | |

FOREIGN PATENT DOCUMENTS

| | | |
|---|---|---|
| CN | 1981942 A | 6/2007 |
| CN | 102387862 A | 3/2012 |
| CN | 103118802 A | 5/2013 |
| CN | 104582846 A | 4/2015 |
| JP | 2000-202304 A | 7/2000 |
| JP | 2004-141703 A | 5/2004 |
| JP | 2006-015205 A | 1/2006 |
| JP | 2007-268484 A | 10/2007 |
| JP | 2009-136833 A | 6/2009 |
| JP | 2013-516307 A | 5/2013 |
| JP | 2015-58406 A | 3/2015 |
| JP | 2013-519516 A | 5/2015 |
| WO | WO 2007/007370 A1 | 1/2007 |
| WO | WO 2010/113585 A1 | 10/2010 |
| WO | WO 2010/113586 A1 | 10/2010 |
| WO | WO 2010/114132 A1 | 10/2010 |

OTHER PUBLICATIONS

Office Action (including English language translation) dated Jan. 8, 2019 in connection with Chinese Patent Application No. 201780004297.0.

* cited by examiner

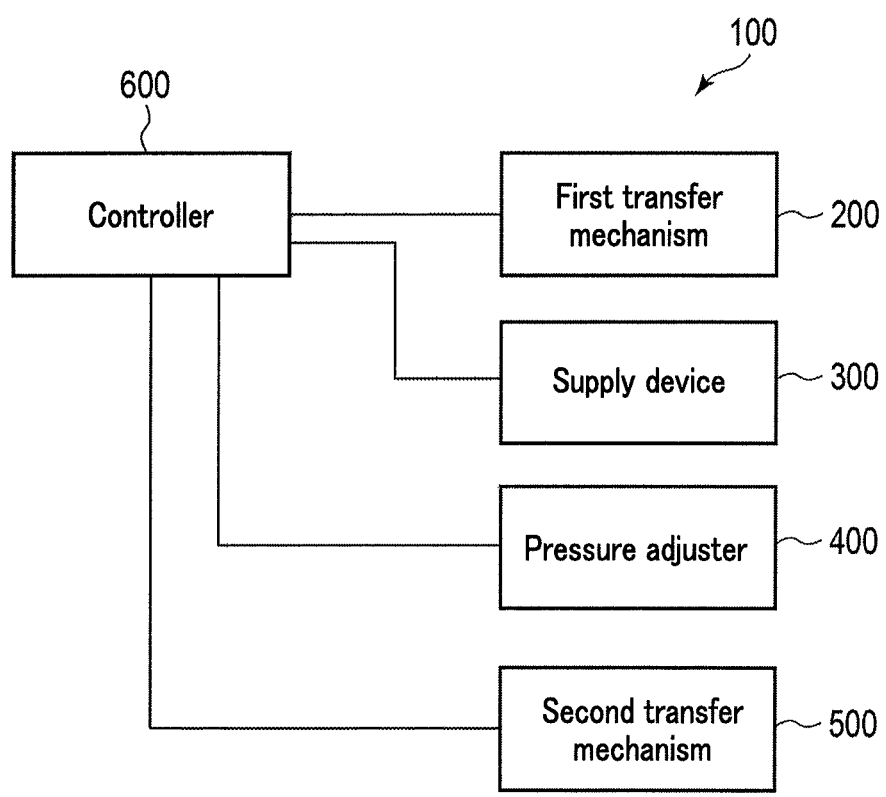
F I G. 3

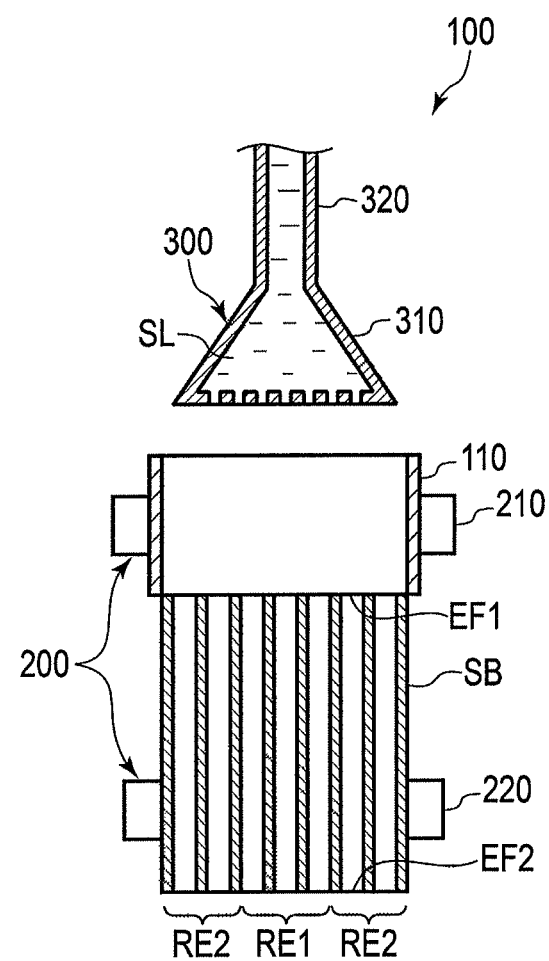
F I G. 4

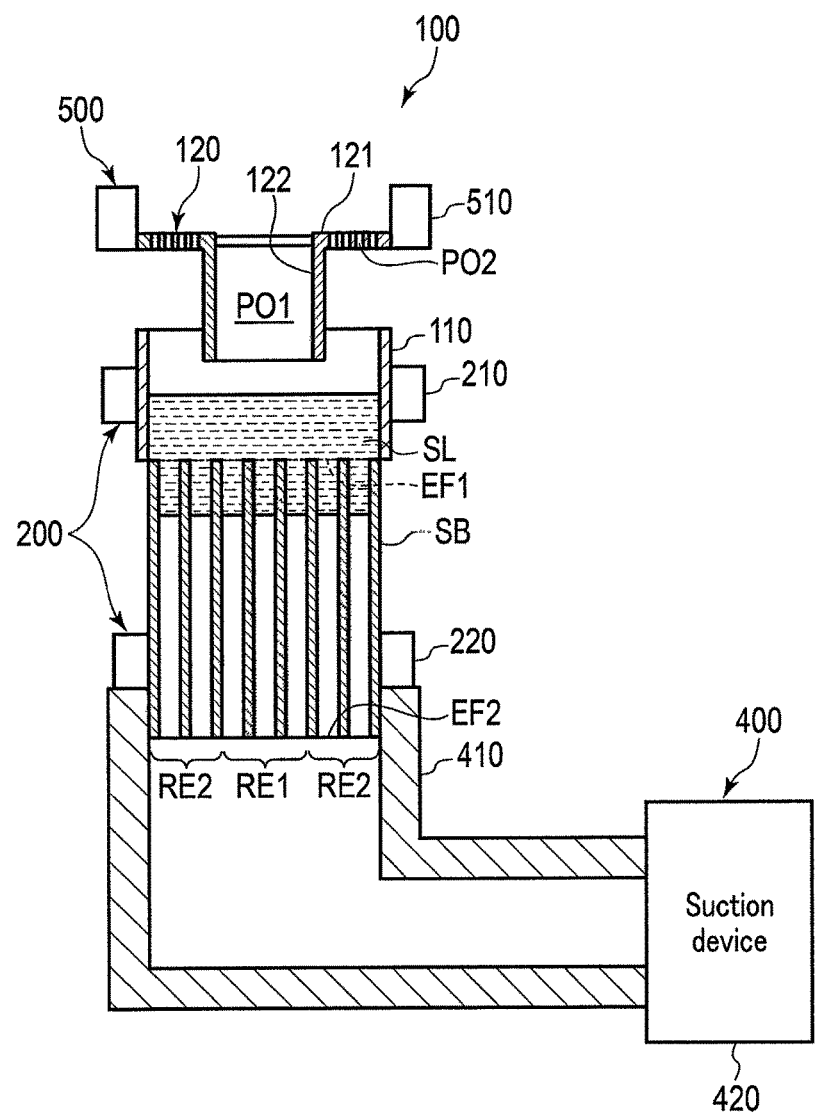
F I G. 7

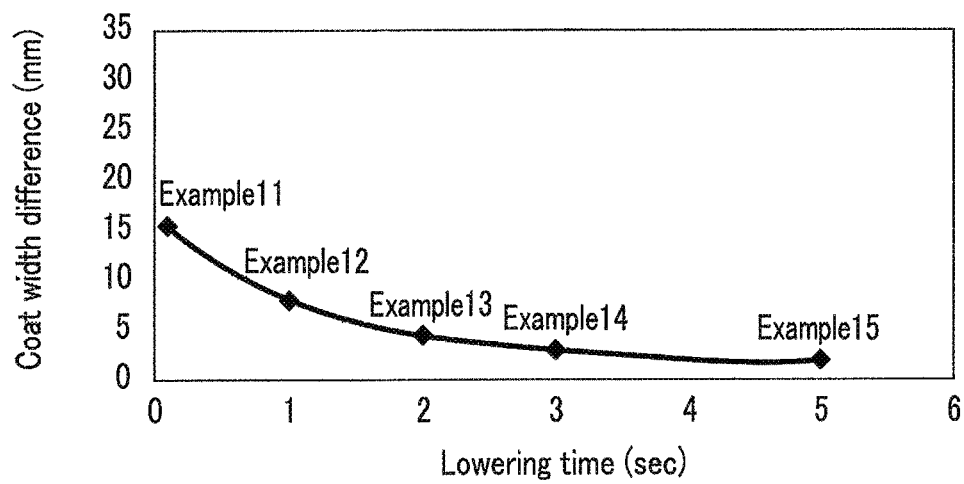
F I G. 15
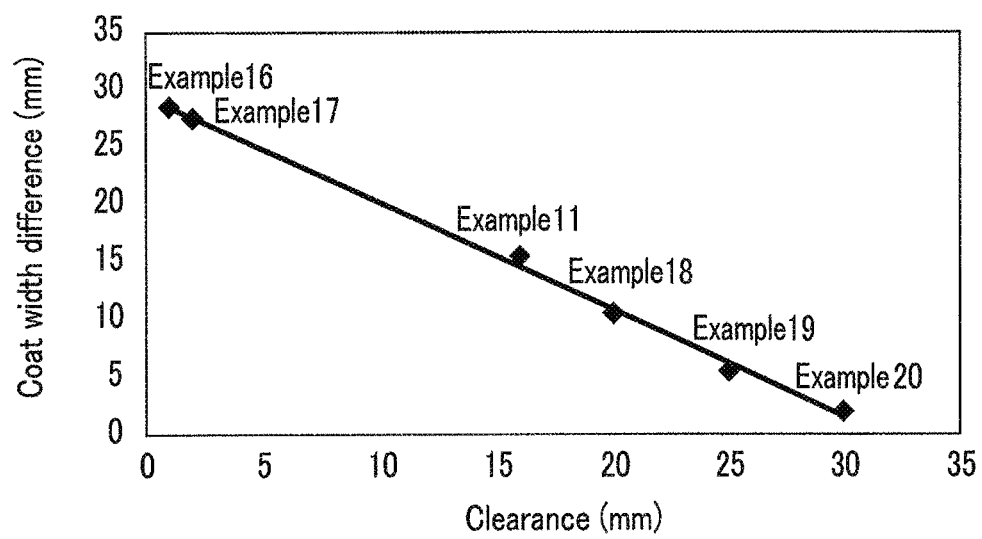
F I G. 16

METHOD AND APPARATUS OF MANUFACTURING EXHAUST GAS-PURIFYING CATALYST

CROSS-REFERENCE TO RELATED APPLICATIONS

This application is a Continuation application of PCT Application No. PCT/JP2017/017877, filed May 11, 2017 and based upon and claiming the benefit of priority from prior Japanese Patent Application NO. 2016-147592, filed Jul. 27, 2016, the entire contents of all of which are incorporated herein by reference.

FIELD

The present invention relates to a technique of manufacturing an exhaust gas-purifying catalyst.

BACKGROUND

An exhaust gas-purifying catalyst includes, for example, a honeycomb substrate having a plurality of holes therein and a catalytic layer formed on the honeycomb substrate. Such an exhaust gas-purifying catalyst can be obtained by, for example, coating the honeycomb substrate with slurry containing a raw material of the catalytic layer and subsequently subjecting the coating film to drying and firing treatments.

Jpn. Pat. Appln. KOKAI Publication No. 2004-141703 describes a technique of coating the partition wall of a honeycomb substrate with slurry to form a slurry layer and then circulating air in the through-holes to remove excessive slurry. In this technique, a flow velocity control plate is provided on the end face of the honeycomb substrate on the air inflow side to prevent the flow velocity from becoming excessively high on the air inflow side when removing excessive slurry. This allows the catalyst coat layer to have the same thickness at the upstream, midstream, and downstream sections.

SUMMARY

In a method of manufacturing an exhaust gas-purifying catalyst, it is preferable that the dimensions in a direction parallel to the longitudinal direction of the holes, that is, the widths or the coat amounts of the portions of the catalytic layer at a certain cell and another cell are independently controllable.

Thus, an object of the present invention is to provide a technique of manufacturing an exhaust gas-purifying catalyst, which can more accurately control the width of a catalytic layer.

According to a first aspect of the present invention, there is provided a method of manufacturing an exhaust gas-purifying catalyst including a substrate, the substrate having a first end face and a second end face and provided with a plurality of holes each extending from the first end face toward the second end face, comprising: locating a reservoir attachment having a frame shape with respect to the substrate such that the reservoir attachment surrounds a region adjacent to the first end face to form, together with the first end face, a reservoir capable of storing slurry in the region; supplying the slurry to the reservoir; reducing a pressure in a region adjacent to the second end face relative to a pressure in a region adjacent to the substrate with the slurry in the reservoir interposed therebetween to guide the slurry in the reservoir into the plurality of holes and generate flows of the slurry from the first end face toward the second end face in the plurality of holes; and moving a gas-flow control tool from a first position where the gas-flow control tool faces the first end face with the slurry in the reservoir interposed therebetween and is spaced apart from the slurry in the reservoir to a second position where the gas-flow control tool faces the first end face with a distance from the first end face shorter than that in the first position, in a period during which the slurry flows from the first end face's side toward the second end face's side, the gas-flow control tool being configured to generate a distribution of linear velocities of gas flows when the gas-flow control tool faces the first end face and gas is passed therethrough toward the first end face.

According to a second aspect of the present invention, there is provided an apparatus of manufacturing an exhaust gas-purifying catalyst including a substrate, the substrate having a first end face and a second end face and provided with a plurality of holes each extending from the first end face toward the second end face, comprising: a reservoir attachment having a frame shape; a first transfer mechanism configured to cause a change in a relative position between the substrate and the reservoir attachment between a first state in which the reservoir attachment and the substrate are located away from each other and a second state in which the reservoir attachment surrounds a region adjacent to the first end face to form, together with the first end face, a reservoir capable of storing slurry in the region; a supply device configured to supply the slurry to the reservoir; a pressure adjuster configured to reduce a pressure in a region adjacent to the second end face relative to a pressure in a region adjacent to the substrate with the slurry in the reservoir interposed therebetween to guide the slurry in the reservoir into the plurality of holes and generate flows of the slurry from the first end face toward the second end face in the plurality of holes; a gas-flow control tool configured to generate a distribution of linear velocities of gas flows when the gas-flow control tool faces the first end face and gas is passed therethrough toward the first end face; a second transfer mechanism configured to move the gas-flow control tool between a first position where the gas-flow control tool faces the first end face with the slurry in the reservoir interposed therebetween and is spaced apart from the slurry in the reservoir and a second position where the gas-flow control tool faces the first end face with a distance from the first end face shorter than that in the first position; and a controller configured to control operations of the first transfer mechanism and the supply device and further control operations of the pressure adjuster and the second transfer mechanism such that the pressure adjuster is brought into operation after the supply device supplies the slurry to the reservoir and that the gas-flow control tool moves from the first position to the second position in a period during which the slurry flows from the first end face's side toward the second end face's side.

BRIEF DESCRIPTION OF THE DRAWINGS

FIG. 3 is a block diagram schematically showing the manufacturing apparatus according to the embodiment of the present invention;

FIG. 4 is a sectional view schematically showing a state in which the manufacturing apparatus shown in FIG. 3 performs a preliminary operation;

FIG. 7 is a sectional view schematically showing a state at the first stage immediately after the manufacturing apparatus shown in FIGS. 3, 4, 5, and 6 starts the suction operation;

FIG. 15 is a graph showing an example of the relationship between the lowering time and the coat width difference;

FIG. 16 is a graph showing an example of the relationship between the clearance and the coat width difference.

DETAILED DESCRIPTION

An embodiment of the present invention will be described below with reference to the accompanying drawings.

An exhaust gas-purifying catalyst which can be manufactured using a manufacturing method according to the embodiment of the present invention will be described first.

Figure 1:
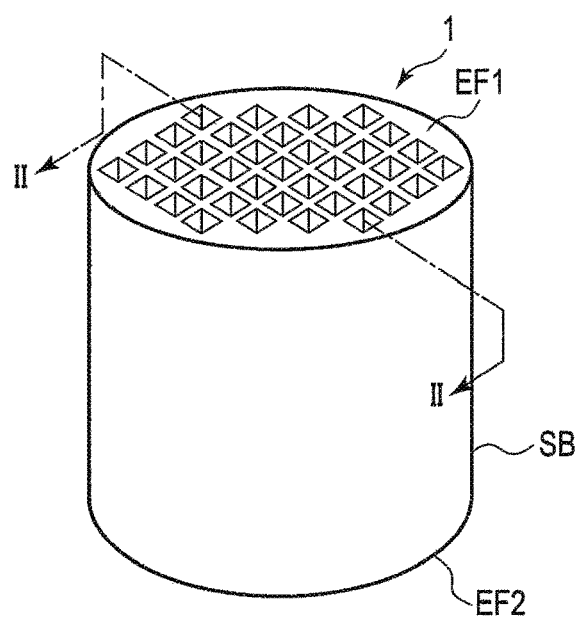
FIG. 1 is a perspective view schematically showing an exhaust gas-purifying catalyst which can be manufactured using the manufacturing method according to the embodiment of the present invention.
Figure 2:
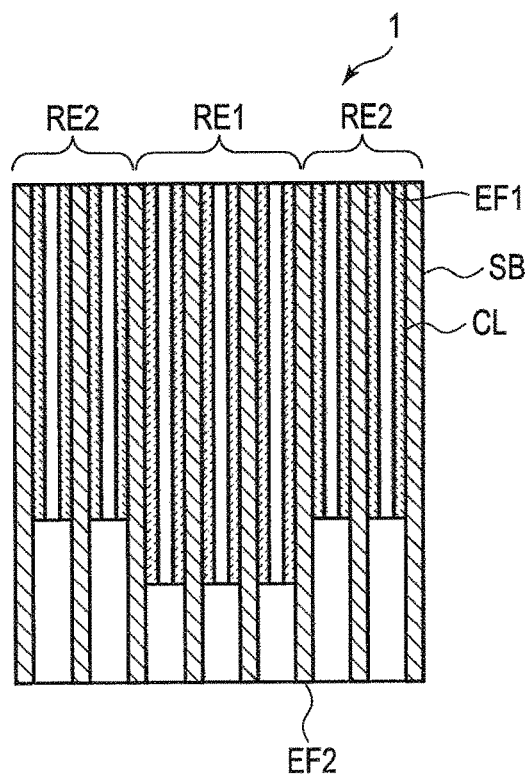
FIG. 2 is a sectional view showing the exhaust gas-purifying catalyst taken along a line II-II in FIG. 1.

FIG. 1 is a perspective view schematically showing an exhaust gas-purifying catalyst which can be manufactured using the manufacturing method according to the embodiment of the present invention. FIG. 2 is a sectional view showing the exhaust gas-purifying catalyst taken along a line II-II in FIG. 1.

An exhaust gas-purifying catalyst 1 shown in FIGS. 1 and 2 includes a substrate SB and catalytic layers CL.

The substrate SB includes a first end face EF1 and a second end face EF2. A plurality of holes each extending from the first end face EF1 toward the second end face EF2 are formed in the substrate SB. The diameters of the plurality of holes are typically equal to each other.

The substrate SB has a cylindrical shape. The substrate SB may have an elliptic cylindrical shape or prism shape.

The substrate SB is a monolith honeycomb substrate used in a straight-flow-type exhaust gas-purifying catalyst. The substrate SB may be a monolith honeycomb substrate used in a wall-flow-type exhaust gas-purifying catalyst.

The catalytic layers CL are supported on the partition walls of the substrate SB. The catalytic layers CL can be obtained by coating the partition walls of the substrate SB with slurry containing a catalyst component, drying the slurry layers, and firing them. The slurry and the slurry coating method will be described in detail later.

The exhaust gas-purifying catalyst 1 includes a first region RE1 and a second region RE2. The first region RE1 is a region extending from part of the first end face EF1 to part of the second end face EF2 in the longitudinal direction of the plurality of holes. The second region RE2 is a region extending from another part of the first end face EF1 to another part of the second end face EF2 in the longitudinal direction of the plurality of holes. The first region RE1 is surrounded by the second region RE2.

In the first region RE1, the catalytic layers CL are formed from the first end face EF1 to a position between the first end face EF1 and the second end face EF2. Note that in the first region RE1, the catalytic layers CL may be formed from the first end face EF1 to the second end face EF2.

In the second region RE2, the catalytic layers CL are formed from the first end face EF1 to a position between the first end face EF1 and the second end face EF2. The dimension of the catalytic layers CL in the longitudinal direction of the holes of the catalytic layers CL, that is, the width is smaller than the width of the catalytic layers CL located in the first region RE1.

Each catalytic layer CL contains a catalytic component. This catalytic component accelerates oxidation reactions of carbon monoxide and hydrocarbons and reductive reaction of a nitrogen oxide in an exhaust gas. The catalytic component is, for example, a platinum group element, a transition metal element, or a mixture thereof. Examples of the platinum group element are platinum, palladium, rhodium, and a mixture thereof. Examples of the transition metal element are nickel, manganese, iron, copper, and a mixture thereof.

In addition to the catalytic component, each catalytic layer CL may contain a refractory carrier, an oxygen storage material, an adsorbent, a binder, or a mixture thereof.

The refractory carrier serves to increase the specific surface area of the catalytic component and suppress sintering of the catalytic component by dissipating heat generated by reaction. The refractory carrier is in, for example, the form of particles. Examples of the refractory carrier are alumina, a composite oxide of alumina and another metallic oxide, and a mixture thereof. A metallic element in the other metallic oxide is, for example, yttrium (Y), lanthanum (La), cerium (Ce), praseodymium (Pr), neodymium (Nd), zirconium (Zr), or a combination of two or more of them.

The oxygen storage material stores oxygen under an oxygen excess condition, and releases oxygen under an oxygen lean condition, thereby optimizing oxidation reaction and reductive reaction. The oxygen storage material is in, for example, the form of particles. The oxygen storage material is preferably ceria, a composite oxide of ceria and another metallic oxide, or a mixture thereof. A metallic element in the other metallic oxide is preferably yttrium (Y), lanthanum (La), praseodymium (Pr), neodymium (Nd), zirconium (Zr), or a combination of two or more of them, or more preferably zirconium.

The adsorbent adsorbs carbon monoxide, hydrocarbons, nitrogen oxide, or a mixture thereof. The adsorbent is in, for example, the form of particles. The adsorbent is, for example, a barium compound, strontium compound, zeolite, sepiolite, or a mixture thereof.

The binder strengthens bonding of components contained in each catalytic layer, thereby improving the durability of the catalyst. As the binder, for example, alumina sol, titania sol, or silica sol is used.

A manufacturing apparatus according to the embodiment of the present invention will be described next.

Figure 5:
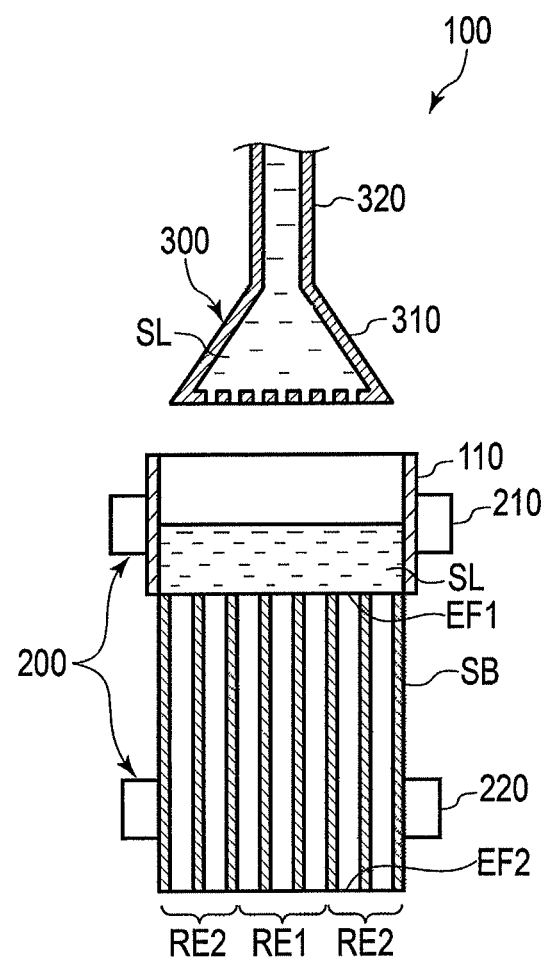
FIG. 5 is a sectional view schematically showing a state after the manufacturing apparatus shown in FIGS. 3 and 4 completes fluid supply.
Figure 6:
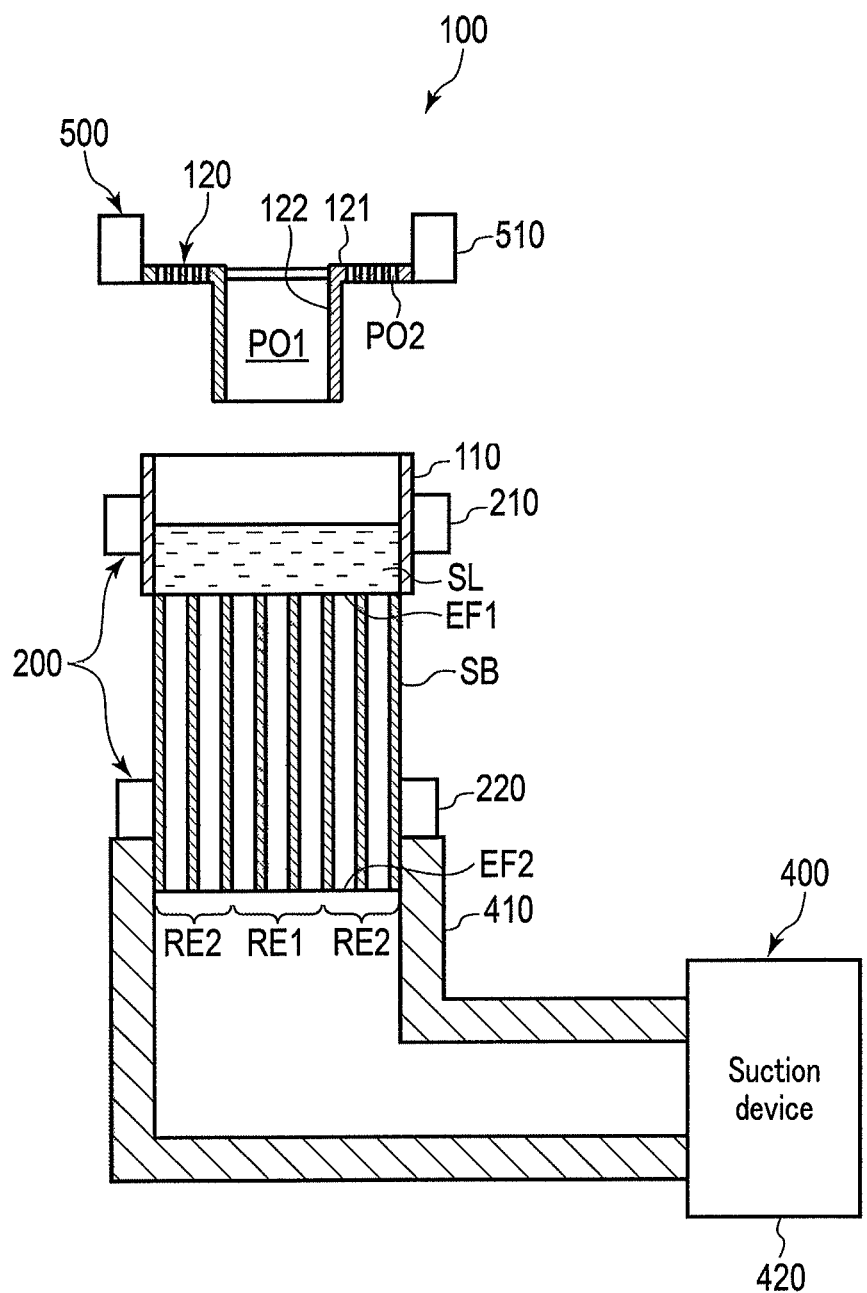
FIG. 6 is a sectional view schematically showing a state before the manufacturing apparatus shown in FIGS. 3, 4, and 5 performs a suction operation.
Figure 8:
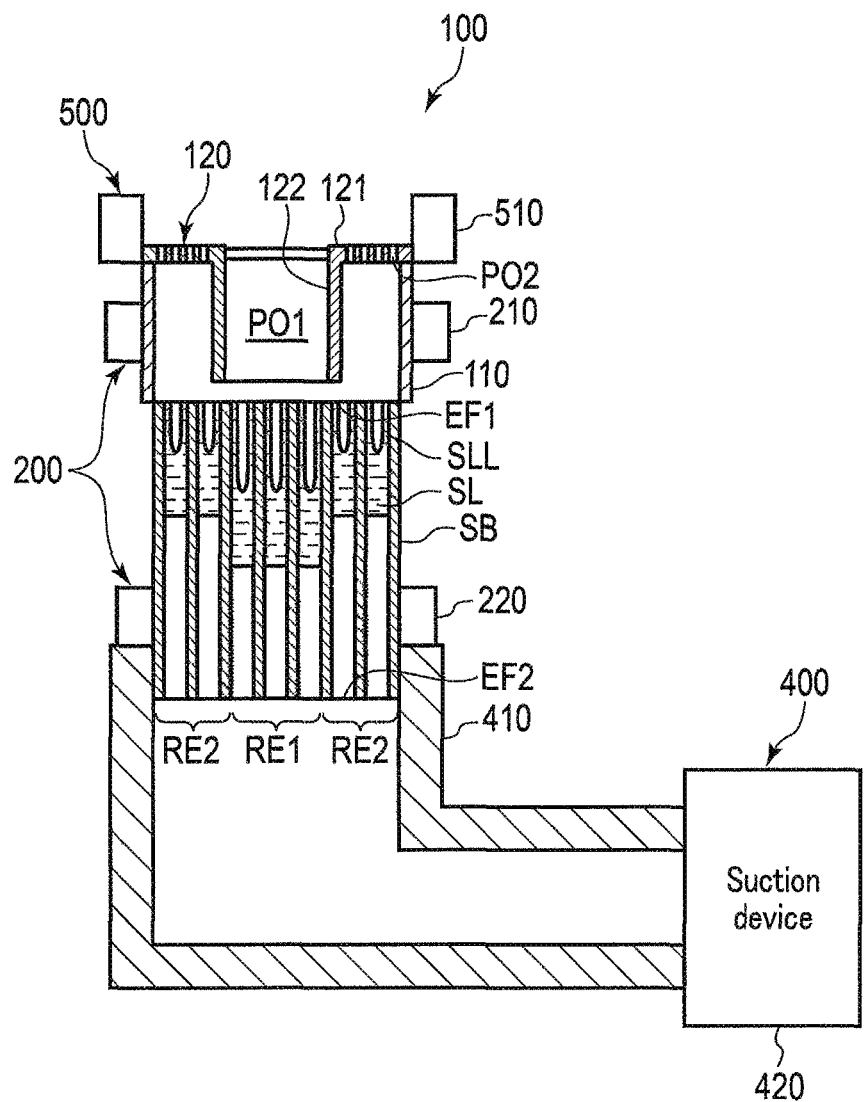
FIG. 8 is a sectional view schematically showing a state at the second stage after the first stage and before the manufacturing apparatus shown in FIGS. 3, 4, 5, 6, and 7 completes the suction operation.
Figure 9:
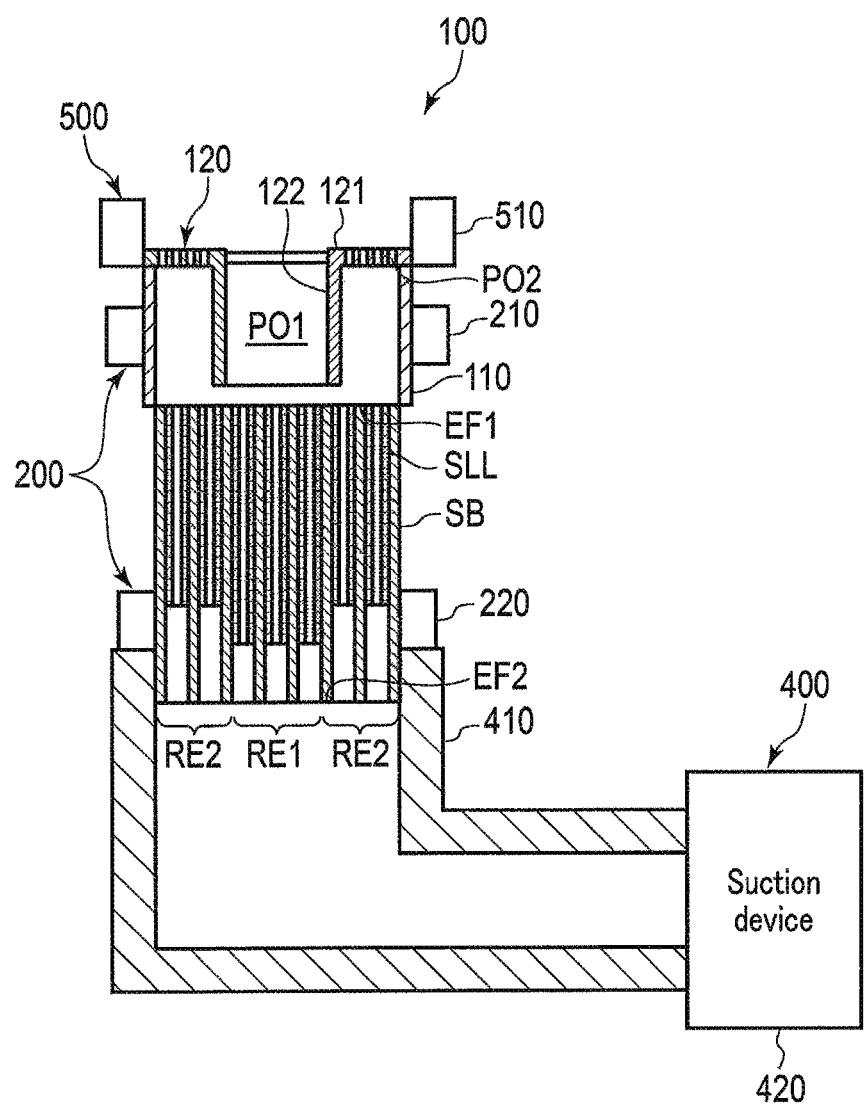
FIG. 9 is a sectional view schematically showing a state after the manufacturing apparatus shown in FIGS. 3, 4, 5, 6, 7, and 8 completes the suction operation.
Figure 10:
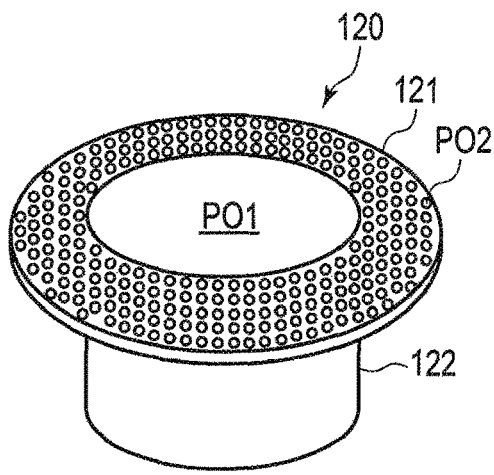
FIG. 10 is a perspective view schematically showing an example of a gas-flow control tool shown in FIGS. 6, 7, 8, and 9.

FIG. 3 is a block diagram schematically showing the manufacturing apparatus according to the embodiment of the present invention. FIG. 4 is a sectional view schematically showing a state in which the manufacturing apparatus shown in FIG. 3 performs a preliminary operation. FIG. 5 is a sectional view schematically showing a state after the manufacturing apparatus shown in FIGS. 3 and 4 completes fluid supply. FIG. 6 is a sectional view schematically showing a state before the manufacturing apparatus shown in FIGS. 3, 4, and 5 performs a suction operation. FIG. 7 is a sectional view schematically showing a state at the first stage immediately after the manufacturing apparatus shown in FIGS. 3, 4, 5, and 6 starts the suction operation. FIG. 8 is a sectional view schematically showing a state at the second stage after the first stage and before the manufacturing apparatus shown in FIGS. 3, 4, 5, 6, and 7 completes the suction operation. FIG. 9 is a sectional view schematically showing a state after the manufacturing apparatus shown in FIGS. 3, 4, 5, 6, 7, and 8 completes the suction operation. FIG. 10 is a perspective view schematically showing an example of a gas-flow control tool shown in FIGS. 6, 7, 8, and 9. FIGS. 3, 4, 5, 6, 7, 8, 9, and 10 do not illustrate some components.

A manufacturing apparatus 100 shown in FIGS. 3, 4, 5, 6, 7, 8, and 9 supplies, to the substrate SB, slurry SL containing a raw material of the catalytic layers CL. The slurry SL contains the above-described catalyst component and a dispersion medium. This dispersion medium may be a polar solvent or nonpolar solvent, and is preferably water. When performing measurement using a cone and plate viscometer at a temperature of 25° C., the viscosity of the slurry SL preferably falls within a range of 50 mPa·s to 400 mPa·s at a shear rate of 380 $s^{-1}$, and preferably falls within a range of 500 mPa·s to 8,000 mPa·s at a shear rate of 4 $s^{-1}$.

The manufacturing apparatus 100 includes a reservoir attachment 110 shown in FIGS. 4, 5, 6, 7, 8, and 9, a gas-flow control tool 120 shown in FIGS. 6, 7, 8, 9, and 10, a first transfer mechanism 200 shown in FIGS. 3, 4, 5, 6, 7, 8, and 9, a supply device 300 shown in FIGS. 3 and 4, a pressure adjuster 400 shown in FIGS. 3, 6, 7, 8, and 9, a second transfer mechanism 500 shown in FIGS. 3, 6, 7, 8, and 9, and a controller 600 shown in FIG. 3.

The reservoir attachment 110 has a frame shape. The inner diameter of one opening of the reservoir attachment 110 is almost equal to the diameter of the first end face EF1 of the substrate SB. The reservoir attachment 110 surrounds a region adjacent to the first end face EF1 to form, together with the first end face EF1, a reservoir capable of storing the slurry SL in the region.

The first transfer mechanism 200 transfers at least one of the reservoir attachment 110 and the substrate SB to change the relative position between the substrate SB and the reservoir attachment 110 between the first state in which the reservoir attachment 110 and the substrate SB are located away from each other and the second state in which the above-described reservoir is formed.

The first transfer mechanism 200 includes the first transfer device and conveyance device (neither of which is shown).

The first transfer device includes a first support 210. The first support 210 supports the reservoir attachment 110. The first transfer device transfers the reservoir attachment 110 from a position away from the substrate SB to a position near the substrate SB so as to form the above-described reservoir.

The conveyance device includes a second support 220. The second support 220 detachably supports the substrate SB. The conveyance device conveys the substrate SB from a position away from a conduit 410 included in the pressure adjuster 400 (to be described later) to a position of one end of the conduit 410.

The supply device 300 supplies the slurry SL to the above-described reservoir. The supply device 300 includes a nozzle 310, a conduit 320, a tank, a switching device, and a second transfer device. Note that the tank, switching device, and second transfer device are not shown.

The nozzle 310 includes a plurality of discharge ports for supplying the slurry SL to the reservoir. The nozzle 310 may have a single discharge port.

The conduit 320 connects the nozzle 310 and the tank. The tank stores the slurry SL.

The switching device switches between the supply of the slurry SL from the tank to the nozzle 310 and the stop of the supply of the slurry SL. In an example, the switching device includes at least one of a valve and a pump.

The second transfer device transfers the nozzle 310 from a position away from the substrate SB to a position facing the first end face EF1 of the substrate SB.

The pressure adjuster 400 includes the conduit 410 and a suction device 420. One end of the conduit 410 is connected to the second end face EF2 of the substrate SB. The other end of the conduit 410 is connected to the suction device 420. The suction device 420 reduces the pressure in the conduit 410.

That is, the pressure adjuster 400 reduces the pressure in a region adjacent to the second end face EF2 in the conduit 410 relative to the pressure in a region adjacent to the substrate SB across the slurry SL in the reservoir. This causes the pressure adjuster 400 to guide the slurry SL in the reservoir into the plurality of holes and generate flows of the slurry SL from the first end face EF1 toward the second end face EF2 in the plurality of holes.

If a gas is passed toward the first end face EF1, the gas-flow control tool 120 generates the distribution of linear velocities in the flow of the gas.

The gas-flow control tool 120 includes a plate 121 having a first through-hole PO1 at the center and having, around the first through-hole PO1, a plurality of second through-holes PO2 with a diameter smaller than that of the first through-hole PO1.

This plate 121 typically has an annular shape. The plate 121 is typically made of a resin, ceramic, metal, or a mixture thereof.

The plate 121 preferably has a shape to cover the upper portion of the reservoir. The diameter of the plate 121 is typically almost equal to or larger than the diameter of the upper portion of the reservoir.

The diameter of the first through-hole PO1 is equal to that of the first region RE1 of the substrate SB described above.

The second through-holes PO2 are preferably, uniformly distributed on the plate 121. The diameter of the second through-holes PO2 falls within, for example, a range of 1 mm to 5 mm.

The gas-flow control tool 120 further includes a partition 122. The partition 122 extends from an edge formed by the first through-hole PO1 in the plate 121 toward the second end face EF2. The partition 122 preferably has a height at the second position to form a gap between the partition 122 and the first end face EF1 of the substrate SB.

The partition 122 typically has a cylindrical shape. The partition 122 is typically made of a resin, ceramic, metal, or a mixture thereof. The partition 122 is welded to the plate 121. The partition 122 may be joined to the plate 121 by an adhesive, or integrally formed with the plate 121. The gas-flow control tool 120 may be obtained by fitting the partition 122 in the plate 121.

The second transfer mechanism 500 includes a third transfer device (not shown). The third transfer device includes a third support 510. The third support 510 supports the gas-flow control tool 120. The third transfer device transfers the gas-flow control tool 120 from the third position to the first position at which the plate 121 faces the first end face EF1 across the slurry SL in the reservoir and is away from the slurry SL in the reservoir. Note that the third position is a position away from a region sandwiched between the nozzle 310 and the substrate SB. The third transfer device transfers the gas-flow control tool 120 from the first position to the second position which faces the first end face EF1 and has a shorter distance from the first end face EF1 than the first position.

The controller 600 is electrically connected to the first transfer mechanism 200, the supply device 300, the pressure adjuster 400, and the second transfer mechanism 500. The controller 600 controls the operations of these mechanisms or devices.

A method of manufacturing the exhaust gas-purifying catalyst 1 by the manufacturing apparatus 100 will be described next with reference to FIGS. 3, 4, 5, 6, 7, 8, 9, and 10. This manufacturing method includes the first to ninth operations to be described below.

In the first operation, the controller 600 operates the first transfer mechanism 200, as follows. That is, the controller 600 operates the conveyance device to convey the substrate SB, to which no slurry SL has been supplied, to a position away from the conduit 410 included in the pressure adjuster 400. Next, the controller 600 operates the first transfer device to transfer the reservoir attachment 110 from a position away from the substrate SB to a position near the substrate SB so as to form the above-described reservoir in the substrate SB. Note that the first operation may be manually performed.

In the first operation, instead of conveying the substrate SB, to which no slurry SL has been supplied, to a position away from the conduit 410 included in the pressure adjuster 400, the substrate SB may be conveyed to the position of the conduit 410. In this case, the fourth operation (to be described later) can be skipped.

In the second operation, the controller 600 operates the supply device 300, as follows. That is, the controller 600 operates the second transfer device to transfer the nozzle 310 from a position away from the substrate SB to a position facing the first end face EF1 of the substrate SB. Next, the controller 600 operates the switching device to supply the slurry SL to the above-described reservoir. The supplied slurry SL typically forms a layer having a relatively uniform thickness on the first end face EF1 of the substrate SB.

The controller 600 operates the switching device to stop the supply of the slurry SL. Next, the controller 600 operates the second transfer device to transfer the nozzle 310 from the above-described position to a position away from the substrate SB.

In the third operation, the controller 600 operates the second transfer mechanism 500, as follows. That is, the controller 600 operates the third transfer device to transfer the gas-flow control tool 120 from a position away from the first position to the first position. When the substrate SB is located at one end of the conduit 410, the first position indicates a position at which the gas-flow control tool 120 faces the first end face EF1 across the slurry SL in the reservoir and is spaced apart from the slurry SL in the reservoir.

In the fourth operation, the controller 600 operates the first transfer mechanism 200, as follows. That is, the controller 600 operates the conveyance device to convey, to one end of the conduit 410, the substrate SB to which the slurry SL has been supplied. Note that the fourth operation may be performed before the third operation.

At this time, a gap has been formed between the gas-flow control tool 120 and the upper end face of the reservoir attachment 110. Furthermore, the first region RE1 of the substrate SB is located downstream of the first through-hole PO1 of the gas-flow control tool 120 along the flow direction of the gas, and the second region RE2 of the substrate SB is located downstream of a portion (to be referred to as a plate portion hereinafter) of the plate 121 of the gas-flow control tool 120 except for the first through-hole PO1.

In the fifth operation, the controller 600 operates the pressure adjuster 400, as follows. That is, the controller 600 operates the pressure adjuster 400 after the substrate SB is conveyed to one end of the conduit 410. The pressure adjuster 400 reduces the pressure in the region adjacent to the second end face EF2 relative to the pressure in the region adjacent to the substrate SB across the slurry SL in the reservoir. The controller 600 operates the suction device 420 to reduce the pressure in the conduit 410.

This causes the pressure adjuster 400 to guide the slurry SL in the reservoir into the plurality of holes, and generate flows of the slurry SL from the first end face EF1 toward the second end face EF2 in the plurality of holes. Coating films made of the slurry SL, that is, slurry layers SLL are formed on portions of the partition walls of the substrate SB, through which the slurry SL has passed.

In the sixth operation, the controller 600 operates the second transfer mechanism 500, as shown in FIGS. 7 and 8. That is, the controller 600 operates the second transfer mechanism 500 to transfer the gas-flow control tool 120 located at the first position to the second position which faces the first end face EF1 and has a shorter distance from the first end face EF1 than the first position, while the slurry SL flows from the first end face EF1 toward the second end face EF2. The second position is typically, directly under the first position. At this time, the second transfer mechanism 500 transfers the gas-flow control tool 120 not to contact the slurry SL.

In the seventh operation, the controller 600 operates the pressure adjuster 400, as follows. That is, simultaneously with or after the transfer of the gas-flow control tool 120 from the first position to the second position, the controller 600 stops the suction of the suction device 420. This stops the flows of the slurry SL from the first end face EF1 toward the second end face EF2 in the plurality of holes of the substrate SB.

In the eighth operation, the controller 600 operates the second transfer mechanism 500, as follows. That is, the controller 600 operates the third transfer device to transfer the gas-flow control tool 120 from the second position to the third position. The eighth operation may be manually performed.

In the ninth operation, the controller 600 operates the first transfer mechanism 200, as follows. That is, the controller 600 operates the first transfer device to detach the reservoir attachment 110 from the substrate SB in which the slurry layers SLL have been formed on the partition walls and transfer the reservoir attachment 110 to a position away from the substrate SB. Then, controller 600 operates the first transfer mechanism 200 to detach the substrate SB from one end of the conduit 410, and conveys it to a position away from the conduit 410. Note that the reservoir attachment 110 may be detached from the substrate SB after conveying the substrate SB to a position away from the conduit 410. The ninth operation may be manually performed. The ninth operation may be performed before the eighth operation.

The above-described method can make the width of the slurry layers SLL in the first region RE1 different from that of the slurry layers SLL in the second region RE2. Note that when performing a continuous operation, the above-described first to ninth operations are repeated.

By subjecting the substrate SB to drying and firing treatments, the exhaust gas-purifying catalyst 1 in which the width of the catalytic layers CL in the first region RE1 is different from that of the catalytic layers CL in the second region RE2 can be obtained.

Note that the exhaust gas-purifying catalyst 1 may be manufactured by conveying the substrate SB to a location where each device is located, or by fixing the substrate SB in one location.

The reason why it is possible to more accurately control the widths of the catalytic layers CL will be described below with reference to FIGS. 7, 8, and 9.

As shown in FIG. 7, when the suction device 420 starts a suction operation, the pressure in the region adjacent to the second end face EF2 of the substrate SB becomes low relative to the pressure in the region adjacent to the substrate SB across the slurry SL. If the pressure difference is sufficiently large, the slurry SL supplied to the reservoir moves into the plurality of holes formed in the substrate SB, and the liquid level of the slurry SL in the reservoir lowers. At this time, portions of the plurality of holes of the substrate SB on the side of the first end face EF1 are closed by the slurry SL.

As shown in FIG. 8, while the suction device 420 is operated, the gas-flow control tool 120 is lowered from the first position to the second position not to contact the slurry SL. During this operation, almost all of the slurry SL in the reservoir moves into the plurality of holes of the substrate SB. Then, air flows into the plurality of holes from the side of the first end face EF1, and formation of holes each extending from the first end face EF1 toward the second end face EF2 in the slurry SL filling the plurality of holes starts.

As the gas-flow control tool 120 is transferred from the first position closer to the second position, the gap formed between the gas-flow control tool 120 and the upper end face of the reservoir attachment 110 becomes smaller. When the gas-flow control tool 120 is at the second position, the gap is almost eliminated. Therefore, if the gas-flow control tool 120 is sufficiently close to the second position, a space above the slurry SL in the reservoir is partitioned by the partition 122 into two regions, that is, an inner region surrounded by the partition 122 and an outer region sandwiched between the partition 122 and the reservoir attachment 110.

A ratio A1/C1 between a total area A1 of the openings of the second through-holes PO2 communicating the outer region and an external space and a capacity C1 of the outer region is lower than a ratio A2/C2 between an area A2 of the opening of the first through-hole PO1 communicating the inner region and the external space and a capacity C2 of the inner region. If the distance from the lower end portion of the partition 122 to the slurry SL or the first end face EF1 is sufficiently short, air is difficult to move between the outer region and the inner region. The liquid level of the slurry SL continuously lowers. Therefore, if the plate 121 is sufficiently close to the reservoir attachment 110, the difference between the pressure in the outer region and that in the conduit 410 is smaller than the difference between the pressure in the inner region and that in the conduit 410.

Consequently, if the gas-flow control tool 120 is sufficiently close to the second position, the velocity of the slurry SL moving in the plurality of holes formed in the second region RE2 and a velocity at which holes extend in the slurry SL filling the plurality of holes are lower than the velocity of the slurry SL moving in the plurality of holes formed in the first region RE1 and a velocity at which holes extend in the slurry SL filling the plurality of holes, respectively.

A velocity at which the gas-flow control tool 120 is transferred from the first position to the second position need only be a velocity at which the gas-flow control tool 120 does not contact the slurry SL. That is, a velocity at which the gas-flow control tool 120 is transferred from the first position to the second position may be equal to, or higher or lower than a velocity at which the slurry SL flows from the reservoir into the plurality of holes of the substrate SB, as long as the gas-flow control tool 120 does not contact the slurry SL.

If suction by the suction device 420 is continued, in the first region RE1, the slurry SL and the holes extending from the first end face EF1 in the slurry SL reach from the first end face EF1 to a position between the first end face EF1 and the second end face EF2, and thus the slurry layers SLL are formed from the first end face EF1 to the position between the first end face EF1 and the second end face EF2. Note that in the first region RE1, the slurry layers SLL may be formed from the first end face EF1 to the second end face EF2.

In the second region RE2, the slurry SL and the holes extending from the first end face EF1 in the slurry SL reach from the first end face EF1 to a position between the first end face EF1 and the second end face EF2. The position which the slurry SL and the holes extending from the first end face EF1 in the slurry SL have reached in the second region RE2 is closer to the first end face EF1 than the position which the slurry SL and the holes extending from the first end face EF1 in the slurry SL have reached in the first region RE1. As a result, the slurry layers SLL are formed from the first end face EF1 to the position between the first end face EF1 and the second end face EF2, and the width of the slurry layers SLL is smaller than that of the slurry layers SLL located in the first region RE1.

As described above, it is possible to make the width of the slurry layers SLL formed in the first region RE1 different from that of the slurry layers SLL formed in the second region RE2.

If the diameter of the plurality of holes formed in the first region RE1 is equal to that of the plurality of holes formed in the second region RE2, the amounts of the slurry SL flowing into the holes are equal to each other. Therefore, if the width of the slurry layers SLL in the second region RE2 is smaller than that of the slurry layers SLL in the first region RE1, the thickness of the slurry layers SLL in the second region RE2 tends to be larger than that of the slurry layers SLL in the first region RE1.

A value (to be referred to as a coat width difference hereinafter) obtained by subtracting the width of the slurry layers SLL formed in the second region RE2 from that of the slurry layers SLL formed in the first region RE1 can be controlled by a ratio A1/A3 between the total area A1 of the openings of the second through-holes PO2 communicating the outer region and the external space and an area A3 of a section perpendicular to the height direction of the outer region and a ratio A2/A4 between the area A2 of the opening of the first through-hole PO1 communicating the inner region and the external space and an area A4 of a section perpendicular to the height direction of the inner region.

That is, if a ratio between the ratio A1/A3 and the ratio A2/A4 is high, when the gas-flow control tool 120 is sufficiently close to the second position, the ratio between the difference between the pressure in the outer region and that in the conduit 410 and the difference between the pressure in the inner region and that in the conduit 410 tends to be low. Therefore, if the ratio between the ratio A1/A3 and the ratio A2/A4 is high, the coat width difference between the slurry layers SLL of the substrate SB tends to be small.

If the ratio between the ratio A1/A3 and the ratio A2/A4 is low, when the gas-flow control tool 120 is sufficiently close to the second position, the ratio between the difference between the pressure in the outer region and that in the conduit 410 and the difference between the pressure in the inner region and that in the conduit 410 tends to be high. Therefore, if the ratio between the ratio A1/A3 and the ratio A2/A4 is low, the coat width difference between the slurry layers SLL of the substrate SB tends to be large.

The ratio between the ratio A1/A3 and the ratio A2/A4 can be controlled by, for example, an opening rate of the plate 121 of the gas-flow control tool 120. The opening rate indicates a ratio of the total area of the second through-holes PO2 to a portion of the main surface of the plate 121 except for the first through-hole PO1.

That is, if the opening rate of the plate 121 is high, the ratio between the ratio A1/A3 and the ratio A2/A4 is high, and the coat width difference between the slurry layers SLL tends to be small. Therefore, from the viewpoint of decreasing the coat width difference between the catalytic layers CL, a plate with preferably an opening rate of 20% or more, more preferably an opening rate of 40% or more, or much more preferably an opening rate of 60% or more is used as the plate 121.

If the opening rate of the plate 121 is low, the ratio between the ratio A1/A3 and the ratio A2/A4 is low, and the coat width difference between the slurry layers SLL tends to be large. Therefore, from the viewpoint of increasing the coat width difference between the catalytic layers CL, a plate with preferably an opening rate of 90% or less, more preferably an opening rate of 80% or less, or much more preferably an opening rate of 60% or less is used as the plate 121.

The coat width difference between the slurry layers SLL can also be controlled by a time (to be referred to as a lowering time) taken to transfer the gas-flow control tool 120 from the first position to the second position.

That is, if the lowering time is long, air readily moves between the outer region and the inner region, and the coat width difference between the slurry layers SLL tends to be small. Therefore, from the viewpoint of decreasing the coat width difference between the catalytic layers CL, if a suction time is 5 sec, and the gas-flow control tool 120 is transferred from the first position to the second position at the start of suction, the lowering time is preferably 0.1 sec or more, more preferably 1.0 sec or more, much more preferably 2.0 sec or more.

If the lowering time is short, air is difficult to move between the outer region and the inner region, and the coat width difference between the slurry layers SLL tends to be large. Therefore, from the viewpoint of increasing the coat width difference between the catalytic layers CL, if the suction time is 5 sec and the gas-flow control tool 120 is transferred from the first position to the second position at the start of suction, the lowering time is preferably 5.0 sec or less, more preferably 3.0 sec or less, or much more preferably 2.0 sec or less.

Furthermore, the coat width difference between the slurry layers SLL can also be controlled by the distance (to be referred to as a clearance hereinafter) between the first end face EF1 and the lower end portion of the partition 122 of the gas-flow control tool 120 at the second position.

That is, if the clearance is large, air readily moves between the outer region and the inner region, and the coat width difference between the slurry layers SLL tends to be small. Therefore, from the viewpoint of decreasing the coat width difference between the catalytic layers CL, the clearance is preferably 1 mm or more, more preferably 2 mm or more, or much more preferably 20 mm or more.

If the clearance is small, air is difficult to move between the outer region and the inner region, and the coat width difference between the slurry layers SLL tends to be large. Therefore, from the viewpoint of increasing the coat width difference between the catalytic layers CL, the clearance is preferably 30 mm or less, more preferably 25 mm or less, or much more preferably 20 mm or less.

An effect achievable when the technique of manufacturing the exhaust gas-purifying catalyst 1 is used will be described in more detail below with reference to FIG. 11.

Figure 11:
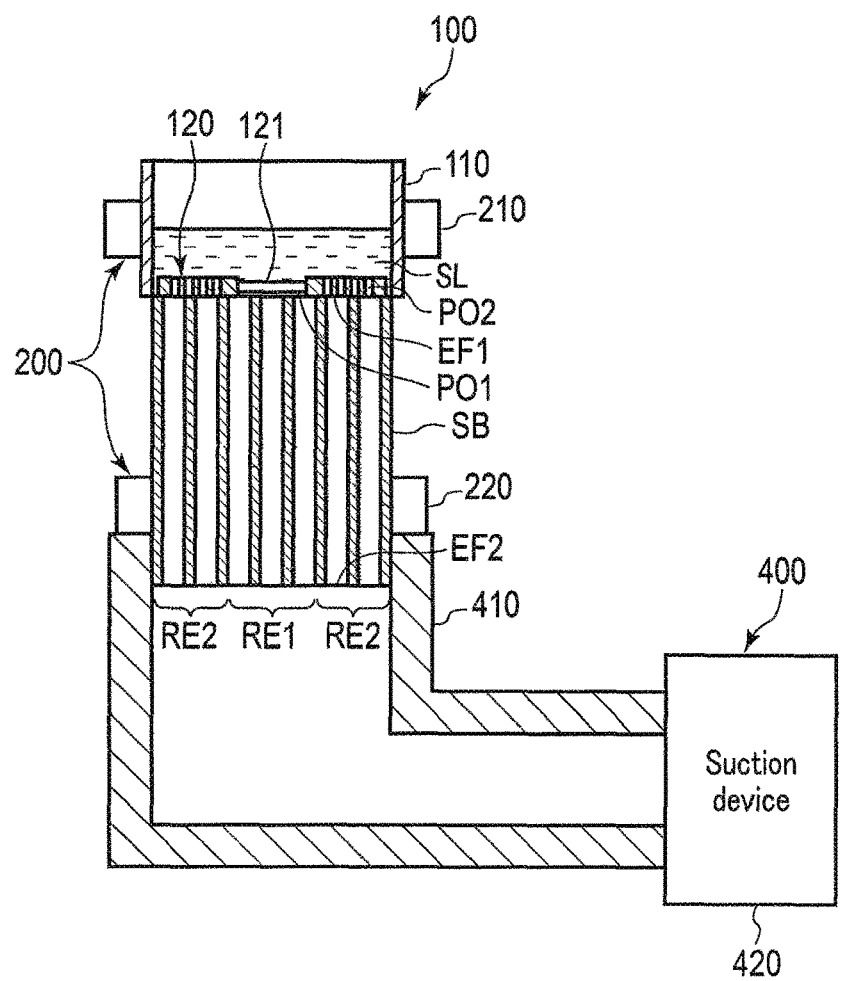
FIG. 11 is a sectional view showing a step in a method of manufacturing an exhaust gas-purifying catalyst according to a comparative example.

FIG. 11 is a sectional view showing a step in a method of manufacturing an exhaust gas-purifying catalyst according to a comparative example. The method according to the comparative example is the same as the above-described method except that a gas-flow control tool 120 including no partition 122 is used, the third operation is performed before the above-described second operation, the gas-flow control tool 120 is arranged to contact a first end face EF1 of a substrate SB in the third operation, and the sixth operation is skipped.

That is, the method according to the comparative example supplies slurry SL into a reservoir after arranging the gas-flow control tool 120 to contact the first end face EF1 of the substrate SB, as shown in FIG. 11. After that, the method arranges the substrate SB at one end of a conduit 410, operates a pressure adjuster 400, and moves the slurry SL from the first end face EF1 toward a second end face EF2.

If this structure is adopted, when a suction device 420 is operated, the gas-flow control tool 120 causes a pressure loss in a fluid passing through a plate portion. Therefore, if this structure is adopted, the difference between the pressure in a region below the plate portion and that in the conduit 410 is smaller than the difference between the pressure in a region below a first through-hole PO1 and that in the conduit 410. A plate portion of a plate 121 is located above a second region RE2 of the substrate SB, and the first through-hole PO1 of the plate 121 is located above a first region RE1 of the substrate SB.

Therefore, the velocity of the slurry SL moving in a plurality of holes formed in the second region RE2 and a velocity at which holes extend in the slurry SL filling the plurality of holes are lower than the velocity of the slurry SL moving in a plurality of holes formed in the first region RE1 and a velocity at which holes extend in the slurry SL filling the plurality of holes, respectively.

Therefore, if the method according to the comparative example is used, the width of slurry layers SLL formed in the first region RE1 can be made different from that of slurry layers SLL formed in the second region RE2.

However, if this structure is adopted, the slurry SL adheres to the gas-flow control tool 120 arranged to contact the first end face EF1 of the substrate SB. Thus, the amount of the slurry SL required to manufacture an exhaust gas-purifying catalyst 1 becomes large. Furthermore, if the slurry SL adhering to the gas-flow control tool 120 covers at least some of the second through-holes PO2 and the first through-hole PO1 formed in the plate 121, the distribution of the fluid passing through the first through-hole PO1 and the second through-holes PO2 changes. Consequently, if this structure is adopted, the widths and coat amounts of the slurry layers SLL vary, and thus desired widths and coat amounts of the catalytic layers CL tend not to be obtained.

To the contrary, if the above-described manufacturing apparatus 100 and manufacturing method are used, the slurry SL never adheres to the gas-flow control tool 120, and the width of the slurry layers SLL in the first region RE1 can be made different from that of the slurry layers SLL in the second region RE2. Therefore, if the above-described manufacturing apparatus 100 and manufacturing method are used, it is possible to suppress variations in widths and coat amounts of the catalytic layers CL.

Consequently, if the above-described manufacturing apparatus 100 and manufacturing method are used, it is possible to more accurately control the widths of the catalytic layers CL, as compared with the manufacturing method according to the comparative example.

In addition, in the manufacturing method according to the comparative example, if continuous production is performed, the amount of the slurry SL adhering to the gas-flow control tool 120 immediately after the start of production is largely different from that of slurry SL adhering to the gas-flow control tool 120 after repeating production. Therefore, in the manufacturing method according to the comparative example, the widths and coat amounts of the catalytic layers CL of the exhaust gas-purifying catalyst 1 immediately after the start of production are different from those of the catalytic layers CL of the exhaust gas-purifying catalyst 1 after repeating production.

In the above-described manufacturing apparatus 100 and manufacturing method, even if continuous production is performed, no slurry SL adheres to the gas-flow control tool 120. Therefore, in the above-described manufacturing apparatus 100 and manufacturing method, even if continuous production is performed, the widths and coat amounts of the catalytic layers CL of the substrate SB hardly vary. That is, the above-described manufacturing method is more appropriate for continuous production of the exhaust gas-purifying catalyst 1 than the method according to the comparative example.

Various modifications can be made for the manufacturing apparatus 100.

For example, an air blower may be used as the pressure adjuster 400 shown in FIGS. 3, 6, 7, 8, and 9, instead of the suction device 420. The air blower sends compressed air to the slurry SL supplied to the reservoir from the first end face EF1 of the substrate SB fixed to the first opening of the conduit 410 toward the second end face EF2. By sending the compressed air, movement of the slurry SL from the first end face EF1 to the second end face EF2 is accelerated.

Furthermore, various modifications can be made for the gas-flow control tool 120 shown in FIGS. 6, 7, 8, 9, and 10.

For example, the partition 122 of the gas-flow control tool 120 may be eliminated. If this structure is adopted, in the above-described sixth operation, the controller 600 operates the second transfer mechanism 500 to transfer the gas-flow control tool 120 from the first position to the second position so the gas-flow control tool 120 does not contact the slurry SL while the slurry SL flows from the first end face EF1 toward the second end face EF2.

If the gas-flow control tool 120 is transferred sufficiently close to the second position during the operation of the suction device 420, the gas-flow control tool 120 causes a pressure loss in a fluid passing through the plate portion. If, therefore, this structure is adopted, the difference between the pressure in a region below the plate portion and that in the conduit 410 is smaller than the difference between the pressure in a region below the first through-hole PO1 and that in the conduit 410. The plate portion of the plate 121 is located above the second region RE2 of the substrate SB and the first through-hole PO1 of the plate 121 is located above the first region RE1 of the substrate SB.

Therefore, the velocity of the slurry SL moving in the plurality of holes formed in the second region RE2 and a velocity at which holes extend in the slurry SL filling the plurality of holes are lower than the velocity of the slurry SL moving in the plurality of holes formed in the first region RE1 and a velocity at which holes extend in the slurry SL filling the plurality of holes, respectively.

Consequently, even if the partition 122 of the gas-flow control tool 120 is eliminated, the slurry SL never adheres to the gas-flow control tool 120 and it is possible to make the width of the slurry layers SLL formed in the first region RE1 different from that of the slurry layers SLL formed in the second region RE2, similarly to the above-described embodiment.

If, however, this structure is adopted, it is necessary to transfer the gas-flow control tool 120 from the upper opening of the reservoir attachment 110 to a lower position in the reservoir. The slurry SL adheres to the inner wall of the reservoir. Therefore, to prevent the slurry SL from adhering to the gas-flow control tool 120, it is necessary to form a sufficient gap between the gas-flow control tool 120 and the inner wall of the reservoir, and air readily flows from the gap into a lower portion of the gas-flow control tool 120.

Thus, if this structure is adopted, the pressure controllability decreases, as compared with a case in which the partition 122 is included. From the viewpoint of more accurately controlling the widths of the catalytic layers CL, the gas-flow control tool 120 preferably includes the partition 122.

The plate 121 of the gas-flow control tool 120 may be a net. Examples of the shape of the net are plain weave and flat-top weave.

As the mesh of the net is larger, the coat width difference between the catalytic layers CL tends to be larger. The mesh indicates a mesh count per inch (2.54 cm). That is, from the viewpoint of increasing the coat width difference between the catalytic layers CL, preferably a 100- or more mesh net, more preferably a 150- or more mesh net, or much more preferably a 200- or more mesh net is used as the net.

As the mesh of the net is smaller, the coat width difference between the catalytic layers CL tends to be smaller. That is, from the viewpoint of decreasing the coat width difference between the catalytic layers CL, preferably a 300- or less mesh net, more preferably a 250- or less mesh net, or much more preferably a 200- or less mesh net is used as the net.

The first through-hole PO1 of the plate 121 of the gas-flow control tool 120 may be eliminated. The diameter of the plate 121 is equal to, for example, the diameter of the eliminated first through-hole PO1. In this case, the partition 122 extending from the outer edge of the plate 121 toward the second end face EF2 is preferably included. If this gas-flow control tool 120 is used, the width of the catalytic layers CL in the first region RE1 can be made smaller than that of the catalytic layers CL in the second region RE2.

The second through-holes PO2 of the plate 121 of the gas-flow control tool 120 may be eliminated. If this gas-flow control tool 120 is used, the coat width difference between the catalytic layers CL tends to be large, as compared with a case in which the gas-flow control tool 120 including the second through-holes PO2 is used.

In this example, an entire portion of the plate 121, which is located in front of the first region RE1, is set as the first through-hole PO1. However, the first through-hole PO1 may be formed in only part of a central portion. In this case, the number of first through-holes PO1 formed in the central portion may be one or two or more.

If the opening rate of the central portion is higher than that of a peripheral portion as a portion around the central portion, it is possible to obtain the same effect as that described above.

In this example, the opening rate of the central portion is set higher than that of the peripheral portion. However, the opening rate of the peripheral portion may be set higher than that of the central portion. In this case, the width of the catalytic layers CL in the first region RE1 may be made smaller than that of the catalytic layers CL in the second region RE2.

The shape of the substrate SB used by the manufacturing apparatus 100 or manufacturing method is not limited to that shown in FIGS. 1, 2, 4, 5, 6, 7, 8, and 9. For example, the same substrate SB as that described above except that the diameter of the plurality of holes formed in the first region RE1 is different from the diameter of the plurality of holes formed in the second region RE2 may be used as the substrate SB.

If this substrate SB is used, when the pressure adjuster 400 is operated in the above-described fifth operation, the slurry SL flowing into the holes with the larger diameter flows more readily than the slurry SL flowing into the holes with the smaller diameter due to the influence of the viscosity of the slurry SL.

Therefore, for example, if the substrate SB in which the diameter of the plurality of holes formed in the first region RE1 is larger than that of the plurality of holes formed in the second region RE2 is used, the coat width difference between the catalytic layers CL is larger than that when the substrate SB in which the diameter of the plurality of holes formed in the first region RE1 is equal to that of the plurality of holes formed in the second region RE2 is used.

Furthermore, if the substrate SB in which the diameter of the plurality of holes formed in the first region RE1 is smaller than that of the plurality of holes formed in the second region RE2 is used, the coat width difference between the catalytic layers CL is smaller than that when the substrate SB in which the diameter of the plurality of holes formed in the first region RE1 is equal to that of the plurality of holes formed in the second region RE2 is used, or is almost eliminated.

In other words, if the manufacturing method and the manufacturing apparatus 100 are used, even if the substrate SB in which the diameter of the plurality of holes formed in the first region RE1 is different from that of the plurality of holes formed in the second region RE2 is used, it is possible to make the width of the catalytic layers CL in the first region RE1 equal to that of the catalytic layers CL in the second region RE2.

Next, a manufacturing apparatus according to a reference example will be described.

Figure 12:
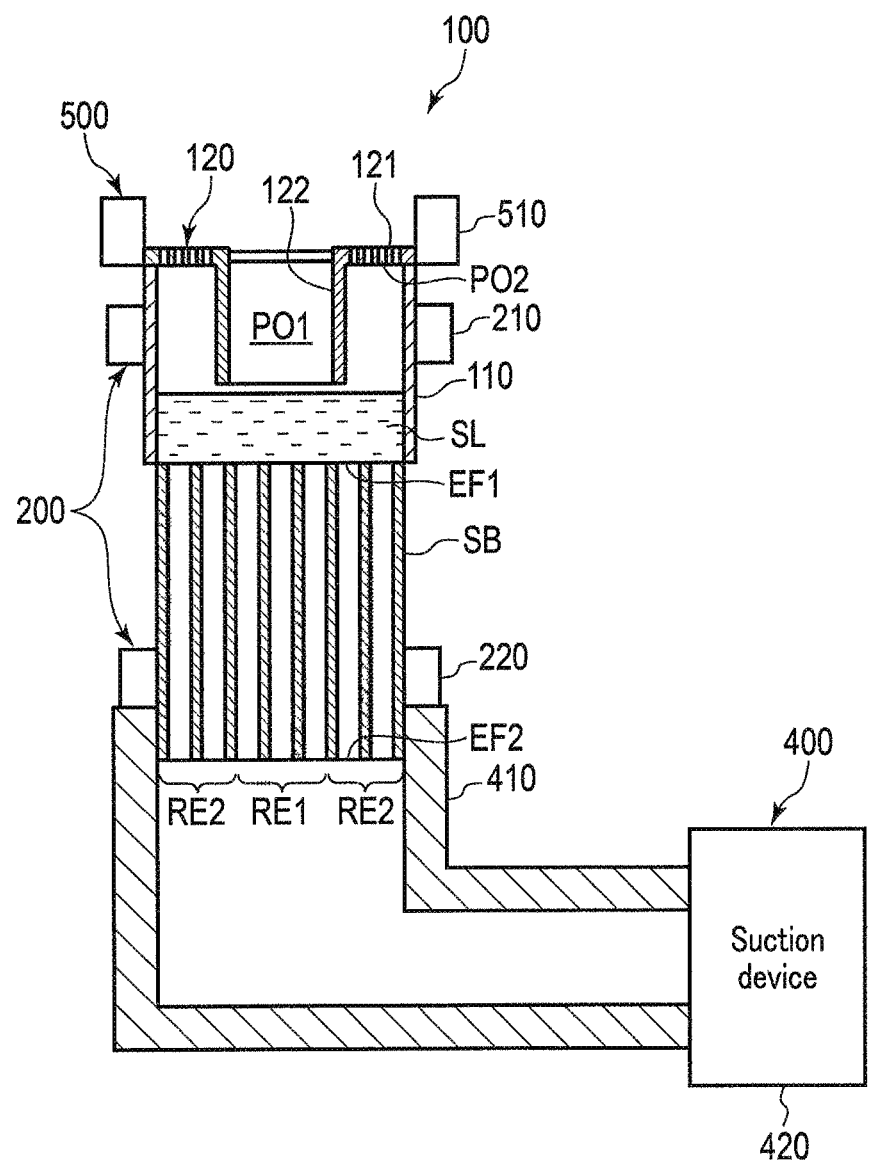
FIG. 12 is a sectional view showing a step in a method of manufacturing an exhaust gas-purifying catalyst according to the reference example.

FIG. 12 is a sectional view showing a step in a method of manufacturing an exhaust gas-purifying catalyst according to the reference example. The manufacturing method by a manufacturing apparatus 100 shown in FIG. 12 is the same as that described above except that the third operation is performed after the fourth operation and the fifth operation is performed after the sixth operation.

FIG. 12 is a view schematically showing a state before the manufacturing apparatus 100 performs a suction operation. In this manufacturing method, as shown in FIG. 12, in the sixth operation, a controller 600 operates a second transfer mechanism 500 to transfer a gas-flow control tool 120 to the second position not to contact slurry SL. At this time, a first region RE1 of a substrate SB is located downstream of a first through-hole PO1 along the flow direction of a gas, and a second region RE2 of the substrate SB is located downstream of a plate portion.

Note that in this manufacturing method, in the above-described third operation, the gas-flow control tool 120 may be transferred to the second position instead of the first position. In this case, the above-described sixth operation can be skipped.

At the second position, the gas-flow control tool 120 and the upper end face of a reservoir attachment 110 are in contact with each other. The distance from the lower end portion of a partition 122 to the slurry SL is sufficiently short. Therefore, if the gas-flow control tool 120 is at the second position, a space above the slurry SL in the reservoir is partitioned by the partition 122 into two regions, that is, an inner region surrounded by the partition 122 and an outer region sandwiched between the partition 122 and the reservoir attachment 110.

A ratio A1/C1 between a total area A1 of the openings of second through-holes PO2 communicating the outer region and an external space and a capacity C1 of the outer region is lower than a ratio A2/C2 between an area A2 of the opening of the first through-hole PO1 communicating the inner region and the external space and a capacity C2 of the inner region.

Therefore, if the controller 600 operates a suction device 420 in the fifth operation after arranging the gas-flow control tool 120 at the second position, the difference between the pressure in the outer region and that in a conduit 410 becomes smaller than the difference between the pressure in the inner region and that in the conduit 410.

Thus, if this structure is adopted, the slurry never adheres to the gas-flow control tool 120, and it is possible to make the width of slurry layers SLL formed in the first region RE1 different from that of slurry layers SLL formed in the second region RE2. Furthermore, it is unnecessary to strictly control the timing of transferring the gas-flow control tool 120 from the first position to the second position, as compared with the manufacturing method in which the sixth operation is performed after the fifth operation.

If, however, this structure is adopted, a gap between the lower end portion of the partition 122 of the gas-flow control tool 120 and the slurry SL on a first end face EF1 increases as the slurry SL moves downward.

That is, if this structure is adopted, air readily moves between the outer region and inner region along with the downward movement of the slurry SL caused by the operation of the suction device 420.

Therefore, if this structure is adopted, the pressure controllability decreases, as compared with the manufacturing method in which the sixth operation is performed after the fifth operation. From the viewpoint of more accurately controlling the widths of the catalytic layers CL, the manufacturing method in which the sixth operation is performed after the fifth operation is superior.

EXAMPLES

Examples of the present invention will be described below.

Example 1

A substrate SB shown in FIG. 1 was prepared. The substrate SB was a cylindrical monolith substrate having a diameter of 103 mm, and a length of 105 mm from a first end face EF1 to a second end face EF2.

Slurry SL was prepared. A solid content of the slurry SL was 30 mass %, and had a viscosity of 4,000 mPa·s at a shear rate of 0.4 s$^{-1}$ and a viscosity of 150 mPa·s at a shear rate of 400 s$^{-1}$ when performing measurement using a cone and plate viscometer at a temperature of 25° C.

A gas-flow control tool 120 was prepared. More specifically, a 300-mesh metal net was cut into a circle, and processed into a shape having, at the center, a circular hole corresponding to a first through-hole PO1, thereby obtaining a plate 121. Then, a partition 122 extending in a direction almost perpendicular to one main surface of the plate 121 was attached to the edge of the hole at the center of the plate 121. Note that the plate 121 had a diameter of 103 mm, and the hole at the center had a diameter of 60 mm.

As shown in FIG. 4, a reservoir attachment 110 was arranged on the first end face EF1 of the substrate SB to form a reservoir. The slurry SL was supplied to the reservoir using a supply device 300. The supply amount of the slurry SL was 250 g.

The gas-flow control tool 120 was arranged at the first position. Then, the substrate SB to which the slurry SL had been supplied was arranged in the first opening of a conduit 410. At this time, the distance between the first end face EF1 and the lower end portion of the partition 122 of the gas-flow control tool 120 was 200 mm.

The suction device 420 was operated. Note that the wind velocity above the substrate SB obtained by operating the suction device 420 before the supply of the slurry SL was 40 m/sec.

At the start of suction, the gas-flow control tool 120 was transferred from the first position to the second position. A time (to be referred to as a lowering time hereinafter) taken for the transfer operation was 1.0 sec. Note that the distance between the first end face EF1 and the lower end portion of the partition 122 of the gas-flow control tool 120 at the second position, that is, a clearance was 16 mm.

The operation of the suction device 420 was stopped 5 sec after the start of suction. In this way, slurry layers SLL were formed in a plurality of holes of the substrate SB.

The slurry layers SLL were dried to obtain coat layers.

The substrate SB was cut along a line II-II in FIG. 1 to confirm a section. As a result, the coat layers were formed from the first end face EF1 to the second end face EF2 in the plurality of holes formed in the first region RE1. The coat layers were formed from the first end face EF1 to a position between the first end face EF1 and the second end face EF2 in the plurality of holes formed in a second region RE2.

A value obtained by subtracting the coat width of the coat layers formed in the second region RE2 from that of the coat layers formed in the first region RE1, that is, a coat width difference was 16.0 mm. Note that no slurry SL adhered to the gas-flow control tool 120.

Example 2

Coat layers were obtained by the same method as that described in Example 1 except that a plate 121 was formed using a 250-mesh metal net instead of forming the plate 121 using the 300-mesh metal net. The coat width difference between the coat layers was 10.5 mm. Note that no slurry SL adhered to a gas-flow control tool 120.

Example 3

Coat layers were obtained by the same method as that described in Example 1 except that a plate 121 was formed using a 200-mesh metal net instead of forming the plate 121 using the 300-mesh metal net. The coat width difference between the coat layers was 5.0 mm. Note that no slurry SL adhered to a gas-flow control tool 120.

Example 4

Coat layers were obtained by the same method as that described in Example 1 except that a plate 121 was formed using a 150-mesh metal net instead of forming the plate 121 using the 300-mesh metal net. The coat width difference between the coat layers was 2.0 mm. Note that no slurry SL adhered to a gas-flow control tool 120.

Example 5

Coat layers were obtained by the same method as that described in Example 1 except that a plate 121 was formed using a 100-mesh metal net instead of forming the plate 121 using the 300-mesh metal net. The coat width difference between the coat layers was 1.0 mm. Note that no slurry SL adhered to a gas-flow control tool 120.

Example 6

Coat layers were obtained by the same method as that described in Example 1 except that a plate 121 was formed using a metallic plate instead of forming the plate 121 using the 300-mesh metal net. The coat width difference between the coat layers was 32.0 mm. Note that no slurry SL adhered to a gas-flow control tool 120.

Example 7

Coat layers were obtained by the same method as that described in Example 6 except that a plurality of second through-holes PO2 was formed in a metallic plate. Note that the second through-holes PO2 had a diameter of 2.0 mm, and the number of second through-holes PO2 was 350. The opening rate of the metallic plate was 20%. The coat width difference between the coat layers was 26.0 mm. Note that no slurry SL adhered to a gas-flow control tool 120.

Example 8

Coat layers were obtained by the same method as that described in Example 7 except that more second through-holes PO2 were formed in a metallic plate. The opening rate of the metallic plate was 40%. The coat width difference between the coat layers was 17.5 mm. Note that no slurry SL adhered to a gas-flow control tool 120.

Example 9

Coat layers were obtained by the same method as that described in Example 7 except that more second through-holes PO2 were formed in a metallic plate. The opening rate of the metallic plate was 60%. The coat width difference between the coat layers was 12.0 mm. Note that no slurry SL adhered to a gas-flow control tool 120.

Example 10

Coat layers were obtained by the same method as that described in Example 7 except that more second through-holes PO2 were formed in a metallic plate. The opening rate of the metallic plate was 90%. The coat width difference between the coat layers was 4.5 mm. Note that no slurry SL adhered to a gas-flow control tool 120.

Example 11

Coat layers were obtained by the same method as that described in Example 7 except that more second through-holes PO2 were formed in a metallic plate and a lowering time was changed from 1.0 sec to 0.1 sec. The opening rate of the metallic plate was 80%. The coat width difference between the coat layers was 15.5 mm. Note that no slurry SL adhered to a gas-flow control tool 120.

Example 12

Coat layers were obtained by the same method as that described in Example 11 except that a lowering time was changed from 0.1 sec to 1.0 sec. The coat width difference between the coat layers was 8.0 mm. Note that no slurry SL adhered to a gas-flow control tool 120.

Example 13

Coat layers were obtained by the same method as that described in Example 11 except that a lowering time was changed from 0.1 sec to 2.0 sec. The coat width difference between the coat layers was 4.5 mm. Note that no slurry SL adhered to a gas-flow control tool 120.

Example 14

Coat layers were obtained by the same method as that described in Example 11 except that a lowering time was changed from 0.1 sec to 3.0 sec. The coat width difference between the coat layers was 3.0 mm. Note that no slurry SL adhered to a gas-flow control tool 120.

Example 15

Coat layers were obtained by the same method as that described in Example 11 except that a lowering time was changed from 0.1 sec to 5.0 sec. The coat width difference between the coat layers was 2.0 mm. Note that no slurry SL adhered to a gas-flow control tool 120.

Example 16

Coat layers were obtained by the same method as that described in Example 11 except that the height of a partition 122 was set larger so that a clearance was changed from 16 mm to 1 mm. The coat width difference between the coat layers was 28.5 mm. Note that no slurry SL adhered to a gas-flow control tool 120.

This coat layer forming operation was successively performed for 30 substrates SB.

Example 17

Coat layers were obtained by the same method as that described in Example 11 except that the height of a partition 122 was set larger so that a clearance was changed from 16 mm to 2 mm. The coat width difference between the coat layers was 27.5 mm. Note that no slurry SL adhered to a gas-flow control tool 120.

Example 18

Coat layers were obtained by the same method as that described in Example 11 except that the height of a partition 122 was set smaller so that a clearance was changed from 16 mm to 20 mm. The coat width difference between the coat layers was 10.5 mm. Note that no slurry SL adhered to a gas-flow control tool 120.

Example 19

Coat layers were obtained by the same method as that described in Example 11 except that the height of a partition 122 was set smaller so that a clearance was changed from 16 mm to 25 mm. The coat width difference between the coat layers was 5.5 mm. Note that no slurry SL adhered to a gas-flow control tool 120.

Example 20

Coat layers were obtained by the same method as that described in Example 11 except that the height of a partition 122 was set smaller so that a clearance was changed from 16 mm to 30 mm. The coat width difference between the coat layers was 2.0 mm. Note that no slurry SL adhered to a gas-flow control tool 120.

Example 21

Coat layers were obtained by the same method as that described in Example 1 except that no gas-flow control tool 120 was used. As a result, the coat width of the coat layers in a first region RE1 was equal to that of the coat layers in a second region RE2.

Example 22

Similarly to the method described in Example 1, a substrate SB and slurry SL were prepared. The same gas-flow control tool as that described in Example 11 except that the partition 122 was eliminated was prepared as a gas-flow control tool 120.

As shown in FIG. 11, the substrate SB was arranged in the first opening of a conduit 410. Then, a reservoir attachment 110 was arranged on a first end face EF1 of the substrate SB to form a reservoir.

The gas-flow control tool 120 was arranged on the first end face EF1 of the substrate SB.

The slurry SL was supplied to the reservoir using a supply device 300. The supply amount of the slurry SL was 250 g.

A suction device 420 was operated to form slurry layers SLL in a plurality of holes of the substrate SB. This suction operation was performed for 5 sec.

The substrate SB was dried to obtain coat layers. The coat width difference between the coat layers was 30 mm. Note that the slurry SL adhered to the gas-flow control tool 120.

This coat layer forming operation was successively performed for 30 substrates SB.

These results are summarized in Table 1.

TABLE 1

|  | Structure of plate | Lowering time (sec) | Clearance (mm) | Adhesion of slurry | Coat width difference (mm) |
|---|---|---|---|---|---|
| Example 1 | Metal net (300 mesh) | 1.0 | 16 | Absence | 16.0 |
| Example 2 | Metal net (250 mesh) | 1.0 | 16 | Absence | 10.5 |
| Example 3 | Metal net (200 mesh) | 1.0 | 16 | Absence | 5.0 |
| Example 4 | Metal net (150 mesh) | 1.0 | 16 | Absence | 2.0 |
| Example 5 | Metal net (100 mesh) | 1.0 | 16 | Absence | 1.0 |
| Example 6 | Metallic plate (opening rate 0%) | 1.0 | 16 | Absence | 32.0 |
| Example 7 | Metallic plate (opening rate 20%) | 1.0 | 16 | Absence | 26.0 |
| Example 8 | Metallic plate (opening rate 40%) | 1.0 | 16 | Absence | 17.5 |
| Example 9 | Metallic plate (opening rate 60%) | 1.0 | 16 | Absence | 12.0 |
| Example 10 | Metallic plate (opening rate 90%) | 1.0 | 16 | Absence | 4.5 |
| Example 11 | Metallic plate (opening rate 80%) | 0.1 | 16 | Absence | 15.5 |
| Example 12 | Metallic plate (opening rate 80%) | 1.0 | 16 | Absence | 8.0 |
| Example 13 | Metallic plate (opening rate 80%) | 2.0 | 16 | Absence | 4.5 |
| Example 14 | Metallic plate (opening rate 80%) | 3.0 | 16 | Absence | 3.0 |
| Example 15 | Metallic plate (opening rate 80%) | 5.0 | 16 | Absence | 2.0 |
| Example 16 | Metallic plate (opening rate 80%) | 0.1 | 1 | Absence | 28.5 |
| Example 17 | Metallic plate (opening rate 80%) | 0.1 | 2 | Absence | 27.5 |
| Example 18 | Metallic plate (opening rate 80%) | 0.1 | 20 | Absence | 10.5 |
| Example 19 | Metallic plate (opening rate 80%) | 0.1 | 25 | Absence | 5.5 |
| Example 20 | Metallic plate (opening rate 80%) | 0.1 | 30 | Absence | 2.0 |
| Example 21 | None | — | — | — | 0 |
| Example 22 | Metallic plate (opening rate 80%) | — | — | Presence | 30 |

In Table 1, in a column of "structure of plate", the mesh of the metal net or the opening rate of the metallic plate is described. In a column of "lowering time (sec)", the time taken to transfer the gas-flow control tool 120 from the first position to the second position is described. In a column of "clearance (mm)", the distance between the first end face EF1 and the lower end portion of the partition 122 of the gas-flow control tool 120 at the second position is described. In a column of "adhesion of slurry", whether the slurry SL adhered to the gas-flow control tool 120 after completion of an experiment was described. In a column of "coat width difference (mm)", a value obtained by subtracting the coat width of the coat layers formed in the second region RE2 from that of the coat layers formed in the first region RE1 is described.

Figure 13:
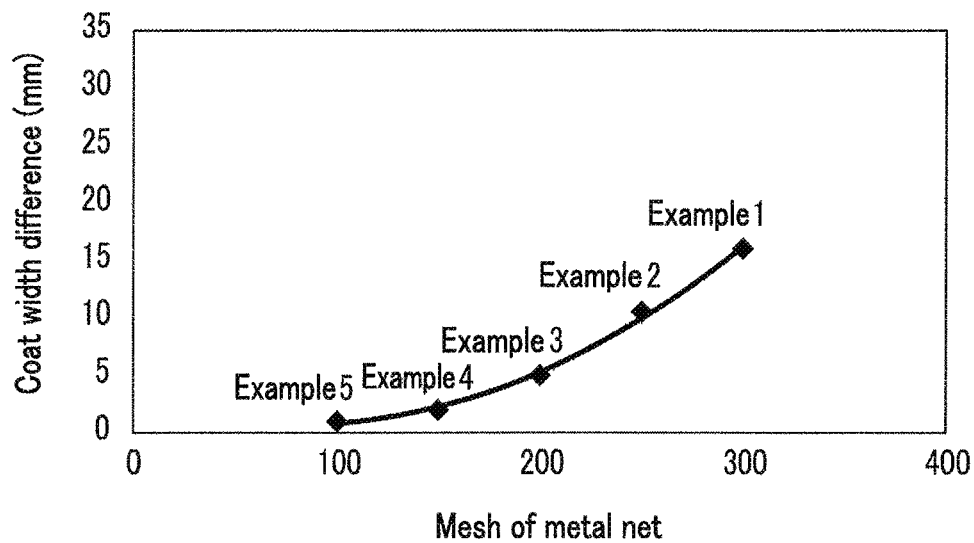
FIG. 13 is a graph showing an example of the relationship between the mesh of the metal net and the coat width difference.

FIG. 13 is a graph showing an example of the relationship between the mesh of the metal net and the coat width difference. FIG. 13 is created using the data obtained in Examples 1 to 5. In the graph shown in FIG. 13, the abscissa represents the mesh of the metal net used as the plate 121 and the ordinate represents the coat width difference between the coat layers.

As shown in Table 1 and FIG. 13, as the mesh of the metal net is larger, the coat width difference between the coat layers tends to be larger. As the mesh of the metal net is smaller, the coat width difference between the coat layers tends to be smaller.

Figure 14:
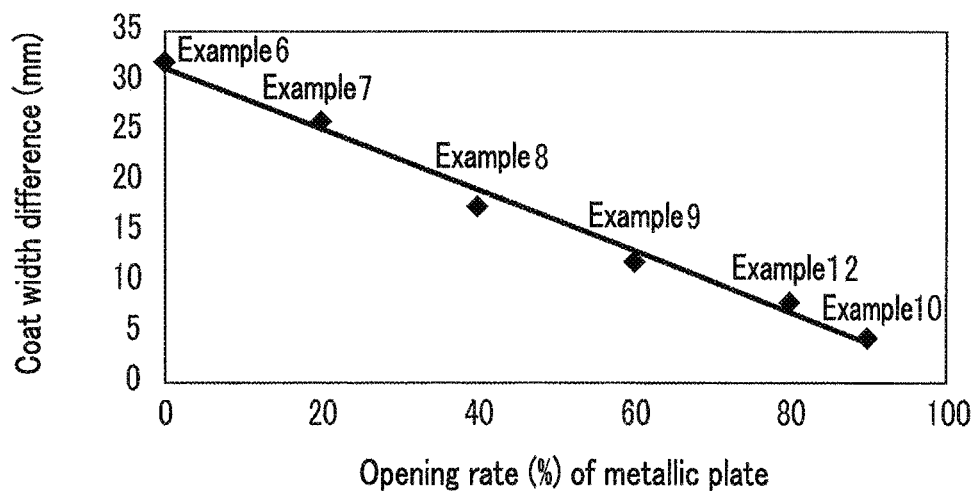
FIG. 14 is a graph showing an example of the relationship between the opening rate of the metallic plate and the coat width difference.

FIG. 14 is a graph showing an example of the relationship between the opening rate of the metallic plate and the coat width difference. FIG. 14 is created using the data obtained in Examples 6 to 10 and 12. In the graph shown in FIG. 14, the abscissa represents the opening rate of the metallic plate used as the plate 121 and the ordinate represents the coat width difference between the coat layers.

As shown in Table 1 and FIG. 14, as the opening rate of the metallic plate is higher, the coat width difference between the coat layers tends to be smaller. As the opening rate of the metallic plate is lower, the coat width difference between the coat layers tends to be larger.

FIG. 15 is a graph showing an example of the relationship between the lowering time and the coat width difference. FIG. 15 is created using the data obtained in Examples 11 to 15. In the graph shown in FIG. 15, the abscissa represents the time taken to transfer the gas-flow control tool 120 from the first position to the second position and the ordinate represents the coat width difference between the coat layers.

As shown in Table 1 and FIG. 15, as the lowering time is shorter, the coat width difference between the coat layers tends to be larger. As the lowering time is longer, the coat width difference between the coat layers tends to be smaller.

FIG. 16 is a graph showing an example of the relationship between the clearance and the coat width difference. FIG. 16 is created using the data obtained in Examples 11 and 16 to 20. In the graph shown in FIG. 16, the abscissa represents the distance between the first end face EF1 and the lower end portion of the partition 122 of the gas-flow control tool 120 at the second position and the ordinate represents the coat width difference between the coat layers.

As shown in Table 1 and FIG. 16, as the clearance is smaller, the coat width difference between the coat layers tends to be larger. As the clearance is larger, the coat width difference between the coat layers tends to be smaller.

Figure 17:
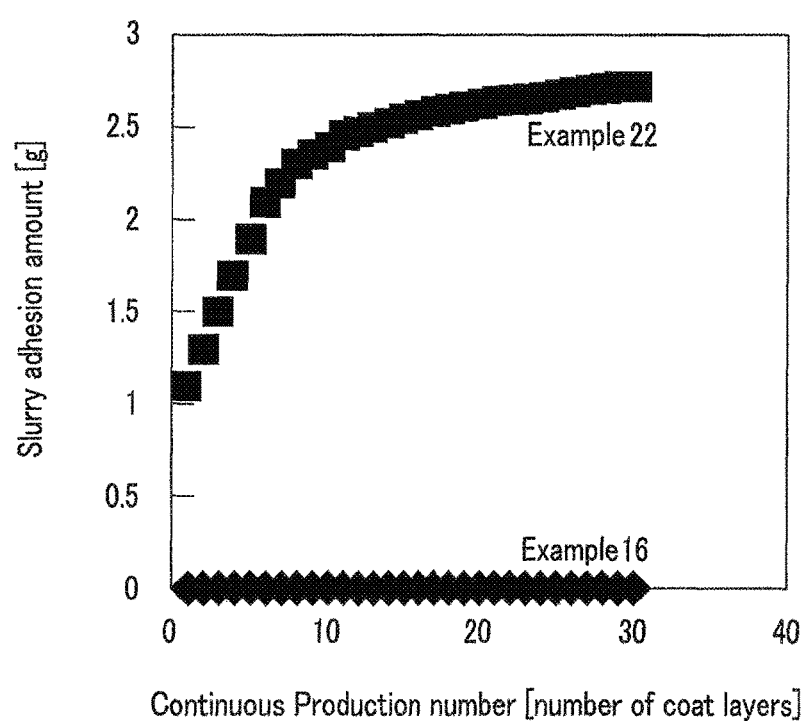
FIG. 17 is a graph showing an example of the relationship between a continuous production number and a slurry adhesion amount.

FIG. 17 is a graph showing an example of the relationship between a continuous production number and a slurry adhesion amount. FIG. 17 is created using the data obtained in Examples 16 and 22. In the graph shown in FIG. 17, the abscissa represents the continuous production number and the ordinate represents the amount of the slurry SL adhering to the gas-flow control tool 120.

As shown in FIG. 17, if the coat layers were continuously produced using the method according to Example 16, no slurry SL adhered to the gas-flow control tool 120. On the other hand, if the coat layers were continuously produced using the method according to Example 22, the adhesion amount of the slurry SL to the gas-flow control tool 120 tended to increase as the production number increases, and the amount of the slurry SL adhering to the gas-flow control tool 120 immediately after the start of production was largely different from that of the slurry SL adhering to the gas-flow control tool 120 after repeating production.

What is claimed is:
1. A method of manufacturing an exhaust gas purifying catalyst including a substrate, the substrate having a first end face and a second end face and provided with a plurality of holes each extending from the first end face toward the second end face, comprising:

locating a reservoir attachment having a frame shape with respect to the substrate such that the reservoir attachment surrounds a region adjacent to the first end face to form, together with the first end face, a reservoir capable of storing slurry in the region;

supplying the slurry to the reservoir;

reducing a pressure in a region adjacent to the second end face relative to a pressure in a region adjacent to the substrate with the slurry in the reservoir interposed therebetween to guide the slurry in the reservoir into the plurality of holes and generate flows of the slurry from the first end face toward the second end face in the plurality of holes; and moving a gas flow control tool from a first position where the gas flow control tool faces the first end face with the slurry in the reservoir interposed therebetween and is spaced apart from the slurry in the reservoir to a second position where the gas flow control tool faces the first end face with a distance from the first end face shorter than that in the first position, in a period during which the slurry flows from the first end face's side toward the second end face's side, the gas flow control tool being configured to generate a distribution of linear velocities of gas flows when the gas flow control tool faces the first end face and gas is passed therethrough toward the first end face.

2. The manufacturing method of claim 1, wherein the gas flow control tool includes a plate having a first through hole at a center and a plurality of second through holes around the first through hole, each of the second through holes having a diameter smaller than a diameter of the first through hole.

3. The manufacturing method of claim 2, wherein the gas flow control tool further includes a partition extending from an edge of the plate at the first through hole toward the second end face.

4. An apparatus of manufacturing an exhaust gas purifying catalyst including a substrate, the substrate having a first end face and a second end face and provided with a plurality of holes each extending from the first end face toward the second end face, comprising:

a reservoir attachment having a frame shape, a first transfer mechanism which includes a first transfer device and a conveyance device, the first transfer device including a first support that supports the reservoir attachment, and the conveyance device including a second support that detachable supports the substrate, the first transfer mechanism is configured to cause a change in a relative position between the substrate and the reservoir attachment being changeable between a first state in which the reservoir attachment and the substrate are located away from each other and a second state in which the reservoir attachment surrounds a region adjacent to the first end face to form, together with the first end face, a reservoir capable of storing slurry in the region;

a supply device including a nozzle having one or more discharge ports and configured to supply the slurry to the reservoir;

a pressure adjuster including a conduit having a first end connected to the second end face of the substrate and a second end and configured to reduce a pressure in a region adjacent to the second end face relative to a pressure in a region adjacent to the substrate with the slurry in the reservoir interposed therebetween to guide the slurry in the reservoir into the plurality of holes and generate flows of the slurry from the first end face toward the second end face in the plurality of holes, the pressure adjuster being brought into operation after the supply device supplies the slurry to the reservoir; and a gas flow control tool including a plate and configured to generate a distribution of linear velocities of gas flows when the gas flow control tool faces the first end face and gas is passed therethrough toward the first end face, a second transfer mechanism including a third transfer device, the third transfer device including a third support that supports the gas-flow control tool, and the second transfer mechanism is configured to move the gas flow control tool being movable between a first position where the gas flow control tool faces the first end face with the slurry in the reservoir interposed therebetween and is spaced apart from the slurry in the reservoir and a second position where the gas flow control tool faces the first end face with a distance from the first end face shorter than that in the first position, and an electric controller unit configured to control operations of the first transfer mechanism and the supply device and further control operations of the pressure adjuster and the second transfer mechanism such that the pressure adjuster is brought into operation after the supply device supplies the slurry to the reservoir and that the gas flow control tool moving from the first position to the second position in a period during which the slurry flows from the first end face's side toward the second end face's side.

5. The manufacturing apparatus of claim 4, wherein the plate of the gas flow control tool includes a first through hole at a center and a plurality of second through holes around the first through hole, each of the second through holes having a diameter smaller than a diameter of the first through hole.

6. The manufacturing apparatus of claim 5, wherein the gas flow control tool further includes a partition extending from an edge of the plate at the first through hole toward the second end face.

7. The manufacturing apparatus of claim 5, wherein the pressure adjuster further comprises a suction device connected to the second end of the conduit.

\* \* \* \* \*